United States Patent
Kano

(10) Patent No.: US 9,571,707 B2
(45) Date of Patent: Feb. 14, 2017

(54) IMAGE PICKUP APPARATUS HAVING DECREASED THICKNESS IN THE VERTICAL DIRECTION

(71) Applicant: CANON KABUSHIKI KAISHA, Tokyo (JP)

(72) Inventor: Takahiko Kano, Tokyo (JP)

(73) Assignee: CANON KABUSHIKI KAISHA, Toyko (JP)

(*) Notice: Subject to any disclaimer, the term of this patent is extended or adjusted under 35 U.S.C. 154(b) by 74 days.

(21) Appl. No.: 14/328,790

(22) Filed: Jul. 11, 2014

(65) Prior Publication Data
US 2015/0022718 A1    Jan. 22, 2015

(30) Foreign Application Priority Data

Jul. 17, 2013 (JP) ................. 2013-148520
Jul. 17, 2013 (JP) ................. 2013-148521

(51) Int. Cl.
*H04N 5/225* (2006.01)
*G03B 17/55* (2006.01)

(52) U.S. Cl.
CPC ............ *H04N 5/2254* (2013.01); *G03B 17/55* (2013.01); *H04N 5/2252* (2013.01)

(58) Field of Classification Search
CPC ...... H04N 5/2252; H04N 5/2254; G03B 17/55
See application file for complete search history.

(56) References Cited

U.S. PATENT DOCUMENTS

| | | | | |
|---|---|---|---|---|
| 5,508,781 A | * | 4/1996 | Imai | G02B 7/08 396/529 |
| 7,333,147 B2 | * | 2/2008 | Adachi | H01L 27/14618 250/208.1 |
| 7,663,820 B2 | * | 2/2010 | Koc | G01D 5/34753 359/819 |
| 7,961,220 B2 | | 6/2011 | Orihashi et al. | |
| 8,144,243 B2 | * | 3/2012 | Kang | H01L 27/14618 348/374 |
| 2005/0270403 A1 | * | 12/2005 | Adachi | H01L 27/14618 348/340 |
| 2015/0326768 A1 | * | 11/2015 | Kim | H04N 5/2252 348/374 |

FOREIGN PATENT DOCUMENTS

| | | |
|---|---|---|
| JP | 06-326905 A | 11/1994 |
| JP | 2008-064863 A | 3/2008 |
| JP | 2012-070272 A | 4/2012 |
| JP | 2012-173330 A | 9/2012 |

* cited by examiner

*Primary Examiner* — Nicholas Giles
(74) *Attorney, Agent, or Firm* — Rossi, Kimms & McDowell LLP

(57) ABSTRACT

An image pickup apparatus that is capable of dissipating heat generated by an image pickup device efficiently, even when a small image pickup device that has electrode pads on almost all the back face is used. The image pickup apparatus has a lens assembly. An image pickup device photoelectrically converts subject light that is incident on the lens assembly. The image pickup device is implemented at one side of a device substrate. A heat dissipation section that dissipates heat generated by the image pickup device is provided at the other side of the device substrate. A heat dissipation sheet is thermally connected to the heat dissipation section at one end, and is thermally connected to an exterior of an apparatus body at the other end.

8 Claims, 28 Drawing Sheets

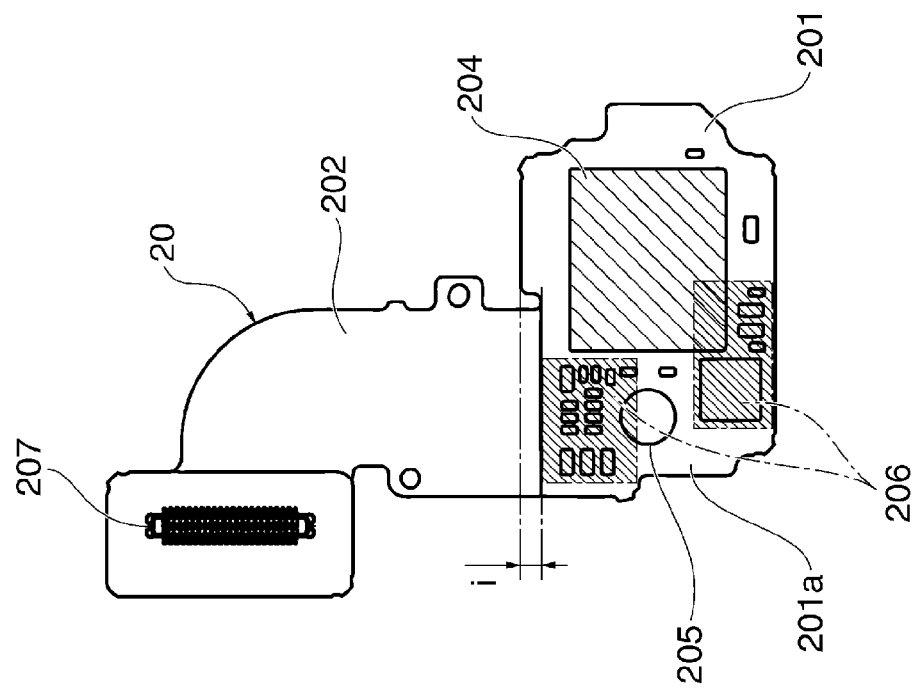
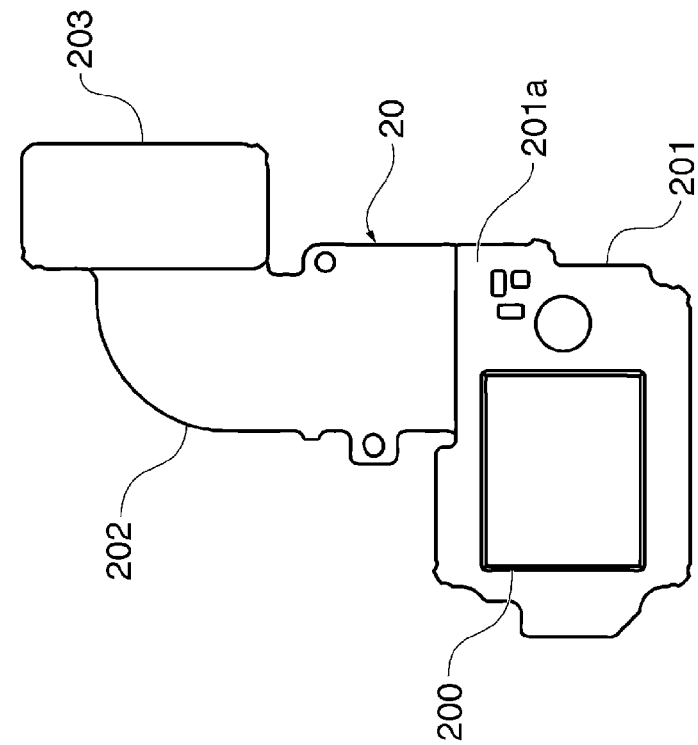
FIG. 13A
FIG. 13B

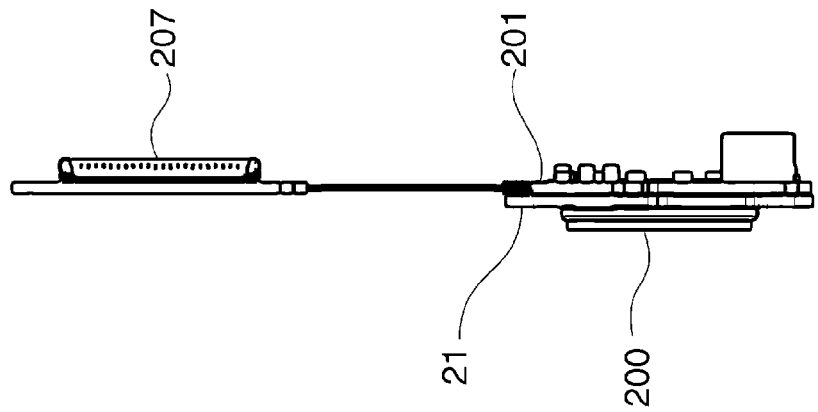
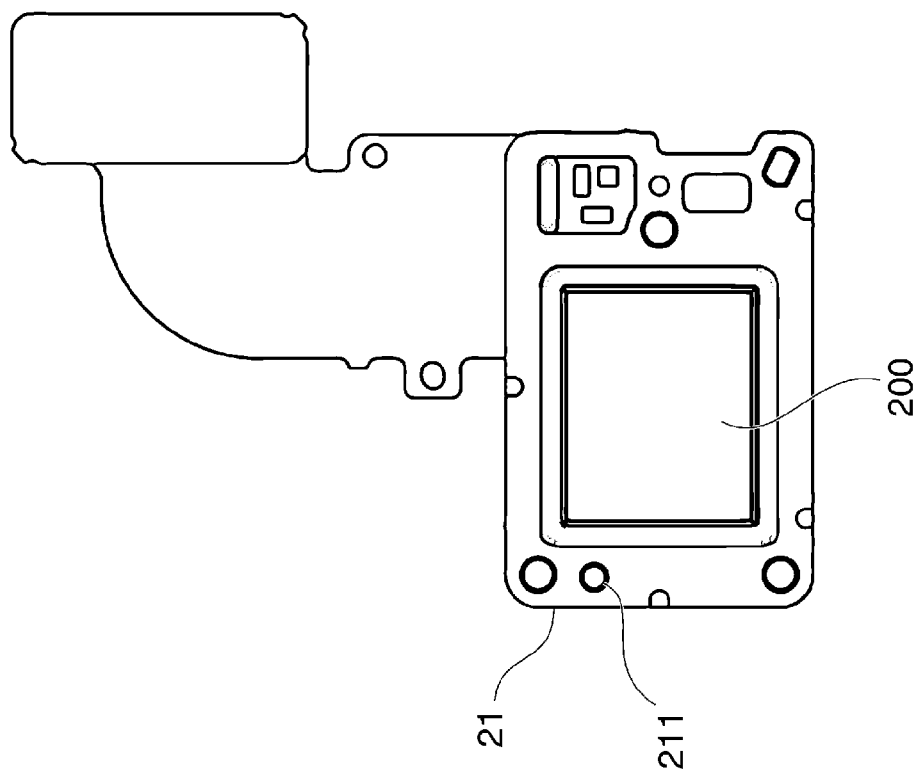

IMAGE PICKUP APPARATUS HAVING DECREASED THICKNESS IN THE VERTICAL DIRECTION

BACKGROUND OF THE INVENTION

Field of the Invention

The present invention relates to a thin image pickup apparatus, such as a digital camera.

Description of the Related Art

An image pickup apparatus, such as a digital camera, is required to attain multi-functionality by improving image quality and processing speed in addition to being compact and thin. This increases a heat value of an image pickup device, and requires efficiently dissipating heat generated by the image pickup device.

There is a known technique that perforates a substrate of an image pickup device and arranges an elastic heat dissipation member in the perforated hole so as to contact a back of the image pickup device (see Japanese Laid-Open Patent Publication (Kokai) No. 2012-70272 (JP 2012-70272A)). Heat generated by the image pickup device is conducted to the heat dissipation member and a heat dissipation plate that contacts the heat dissipation member.

Moreover, there is another known technique that attaches a base to a back of an image pickup device package and forms a plurality of fins on a back of the base (see Japanese Laid-Open Patent Publication (Kokai) No. 2008-64863 (JP 2008-64863A)). Heat generated by the image pickup device is conducted to the fins through the base and is dissipated to the inside of an image pickup apparatus.

Incidentally, some image pickup apparatuses in recent years employ small image pickup devices of a BGA (Ball Grid Array) type or a LGA (Land Grid Array) type in order to miniaturize apparatus bodies. Such an image pickup device has electrode pads on the back face thereof and can connect signal lines with a substrate through the electrode pads when the device is implemented.

Since an image pickup device of the BGA type or the LGA type has electrode pads on almost all the back face, a part of the electrode pads cannot connect to a substrate when an area of the substrate on which the image pickup device is implemented is perforated. That is, the heat dissipation structure proposed by JP 2012-70272A cannot be applied to such a type of an image pickup device.

Moreover, an image pickup device and a substrate thereof may be arranged close to another heat source (for example, a main board unit) in a compact and thin image pickup apparatus.

In this case, when heat of the image pickup device is dissipated to the inside of the image pickup apparatus using the technique of JP2008-64863A, the internal temperature of the image pickup apparatus rises rapidly, which may increase the temperature of an IC on the main board unit rapidly, for example. Moreover, when another heat source close to the image pickup device and to the substrate has larger heat value than that of the image pickup device, heat from the other heat source may be conducted to the image pickup device through the fins, which increases the temperature of the image pickup device.

Incidentally, it is necessary to arrange a lens unit having an image pickup device and a main board unit having an image processing circuit, a control circuit, etc. appropriately in a camera body when decreasing a thickness of a digital camera in the vertical direction, Japanese Laid-Open Patent Publication (Kokai) No. H6-326905 (JP H6-326905A) discloses a video camera in which a frame is attached to a side of a lens unit having an image pickup device and a video signal processing board (a main board unit) is arranged to the frame so as to be parallel to the side of the lens unit.

Moreover, Japanese Laid-Open Patent Publication (Kokai) No. 2012-173330 (JP 2012-173330A) discloses an image pickup apparatus in which a shade hood is mounted at a subject side of an exterior member and a circuit board (a main board unit) is arranged in an inside space of the shade hood at the counter side of a subject. The circuit board is arranged at an outer position of one side of the lens unit so as to be parallel to the side of the lens unit.

In both of JP H6-326905A and JP 2012-173330A, the main board unit is arranged at the outer position of one side of the lens unit so as to be parallel to the side of the lens unit. When a digital camera, which is thin in the vertical direction, is going to be achieved by applying such an arrangement, a main board unit will be arranged at an outer position of an upper side or lower side of a lens unit so as to be parallel to the upper side or the lower side of the lens unit.

In this case, the thickness of the digital camera in the vertical direction is at least larger than the total thickness of the lens unit and the main board unit.

SUMMARY OF THE INVENTION

The present invention provides an image pickup apparatus that is capable of dissipating heat generated by an image pickup device efficiently, even when a small image pickup device that has electrode pads on almost all the back face is used. Moreover, the present invention provides an image pickup apparatus that is thinner than the total thickness of a lens unit and a main board unit.

Accordingly, a first aspect of the present invention provides an image pickup apparatus comprising a lens assembly, an image pickup device configured to photoelectrically convert subject light that is incident on the lens assembly, a device substrate to which the image pickup device is implemented at one side, and on which a heat dissipation section that dissipates heat generated by the image pickup device is provided at the other side, and a heat dissipation sheet configured to be thermally connected to the heat dissipation section at one end, and to be thermally connected to an exterior of an apparatus body at the other end.

Accordingly, a second aspect of the present invention provides an image pickup apparatus comprising a lens unit configured to have a lens assembly that is arranged at a front side of an apparatus body, and an image pickup device that photoelectrically converts subject light that is incident on the lens assembly, and a main board unit configured to be arranged so as to surround a rear side and right and left sides of the lens unit in a direction approximately parallel to an optical axis of the lens assembly within the range of the height of the lens unit in a vertical direction.

According to the present invention, the image pickup apparatus that is capable of dissipating heat generated by the image pickup device efficiently can be provided, even when a small image pickup device that has electrode pads on almost all the back face is used. Moreover, the image pickup apparatus that is thinner than the total thickness of the lens unit and the main board unit can be provided.

Further features of the present invention will become apparent from the following description of exemplary embodiments with reference to the attached drawings.

BRIEF DESCRIPTION OF THE DRAWINGS

FIG. 13A is a front view showing a sensor substrate of the lens unit shown in FIG. 11.

FIG. 13B is a back view showing the sensor substrate of the lens unit shown in FIG. 11.

FIG. 14A is a front view showing a state where the sensor substrate of the lens unit shown in FIG. 11 is adhered and fixed to a sensor plate.

FIG. 14B is a right side view of FIG. 14A.

DESCRIPTION OF THE EMBODIMENTS

Hereafter, embodiments according to the present invention will be described in detail with reference to the drawings.

Figure 1:
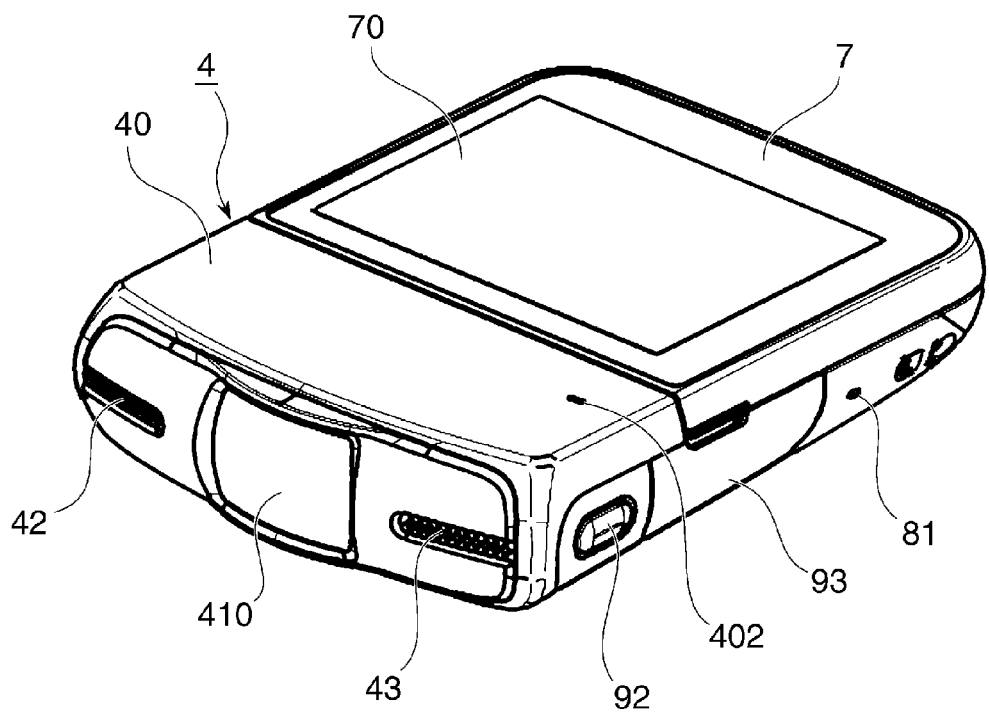
FIG. 1 is a perspective view showing a digital camera that is an example of an embodiment of the image pickup apparatus according to the present invention viewed from a front side (a subject side).
Figure 2:
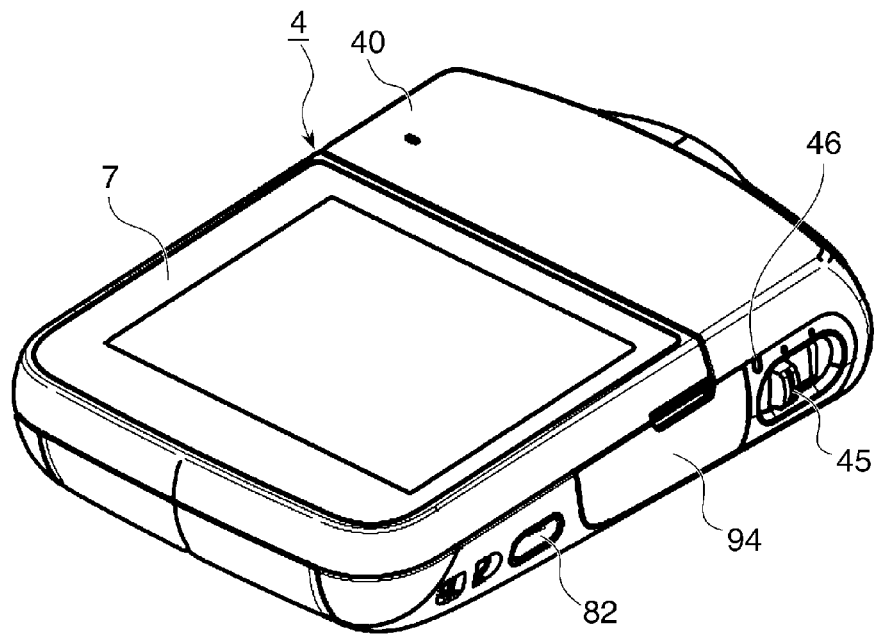
FIG. 2 is a perspective view showing the digital camera shown in FIG. 1 viewed from a rear side.
Figure 3:
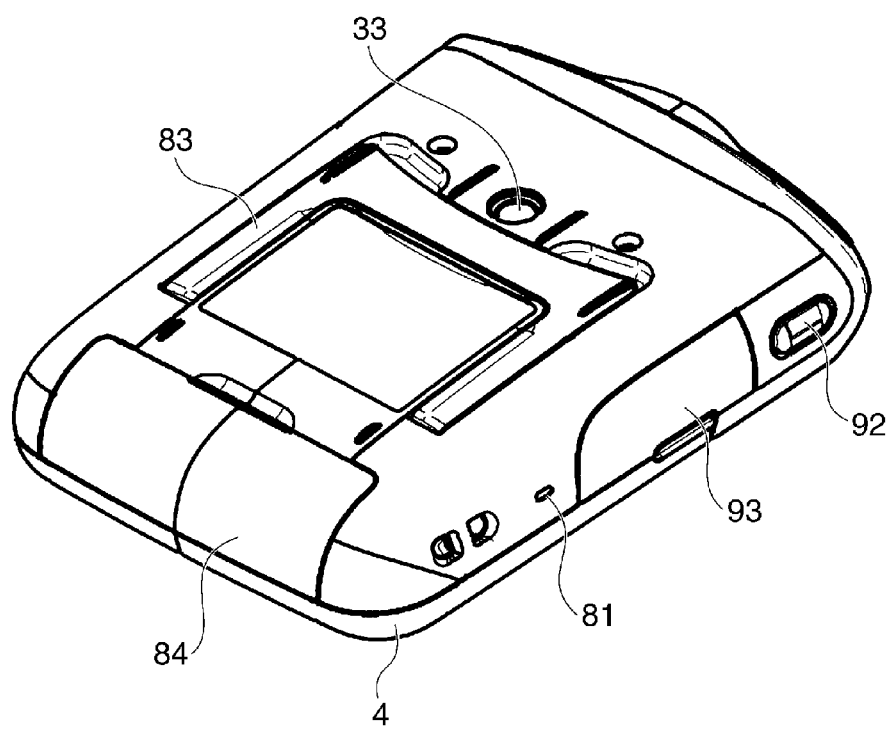
FIG. 3 is a perspective view showing the digital camera shown in FIG. 1 viewed from a bottom side.
Figure 4:
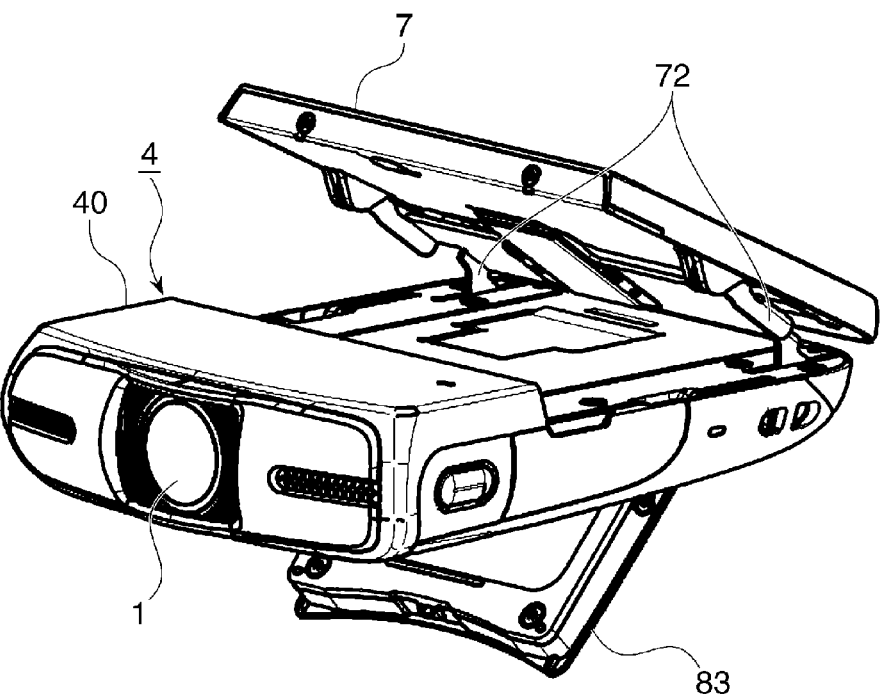
FIG. 4 is a perspective view showing the digital camera shown in FIG. 1 in a state where a display unit and a stand unit open in specific angles, respectively.

FIG. 1 is a perspective view showing a digital camera that is an example of an embodiment of the image pickup apparatus according to the present invention viewed from a front side (a subject side). FIG. 2 is a perspective view showing the digital camera shown in FIG. 1 viewed from a rear side. FIG. 2 is a perspective view showing the digital camera shown in FIG. 1 viewed from a bottom side. FIG. 4 is a perspective view showing the digital camera shown in FIG. 1 in a state where a display unit and a stand unit open in specific angles, respectively. Although the embodiment shows the digital camera that is compact and thin in an vertical direction as an example of an image pickup apparatus, the present invention is not limited to the embodiment.

As shown in FIG. 1 through FIG. 4, the digital camera of the embodiment has a camera body 4, and a front cover 40 that covers a front side of the camera body 4. A barrier 410 that opens and closes a lens assembly 1 (see FIG. 4) is mounted on the front cover 40, and microphones 42 and 43 are arranged at right and left sides of the barrier 410, respectively. Moreover, a loudspeaker 402 and a display unit 7 are provided on a top portion of the camera body 4. The display unit 7 has the display section 70 that consists of an image display panel like an LCD, a touch panel, etc. The camera body 4 is equivalent to an example of the apparatus body of the present invention.

A tripod base 33, a battery lid 84, and a stand unit 83 are provided on a bottom portion of the camera body 4. An access LED window 81, a release knob 92, a card lid 93, etc.

are provided on one side of the camera body 4. A power LED window 46, a reproduction knob 82, a power knob 45, a jack lid 94, etc. are provided on the other side of the camera body 4. It should be noted that the card lid 93 and the jack lid 94 can open and close with respect to the camera body 4.

The power knob 45 turns on and off the power of the camera body 4 with a sliding operation. A power ON operation opens the barrier 410 and exposes the lens assembly 1, and a power OFF operation closes the barrier 410.

When the barrier 410 opens as shown in FIG. 4, subject light enters into the lens assembly 1 that includes a taking lens group and forms an image on an image pickup device. The image pickup device converts the subject image photoelectrically, and outputs the converted image information to a main board unit mentioned later. The image information outputted to the main board unit is outputted to the display unit 7, and is displayed on the display section 70.

Moreover, as shown in FIG. 4, the stand unit 83 is supported by the camera body 4 so as to rotate in an opening-and-closing direction. The display unit 7 is supported by the camera body 4 via a two-axis hinge 72, can open and close by pivoting on an axis at the side of the camera body 4, and can pivot on the other axis at the side of the display unit 7 under a state where the display unit 7 opens at 90 degrees. This enables a self-shot in a state where the display section 70 of the display unit 7 is directed in the direction of the lens assembly 1.

Figure 5:
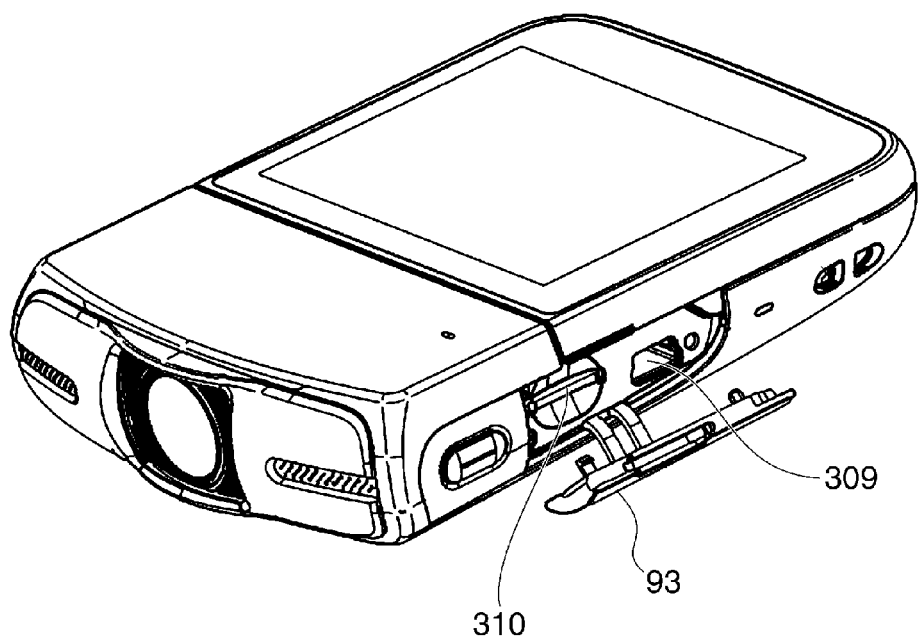
FIG. 5 is a perspective view showing the digital camera shown in FIG. 1 in a state where a card lid opens with respect to a camera body.

FIG. 5 is a perspective view showing a state where the card lid 93 opens with respect to the camera body 4. As shown in FIG. 5, when the card lid 93 is opened, an information communicating terminal 309 and a card connector 310 appear. The information communicating terminal 309 and the card connector 310 are implemented on a main substrate mentioned later.

The information communicating terminal 309 is a USB terminal, for example. When one end of an information communication cable (for example, a USB cable, not shown) is connected to the information communicating terminal 309 and the other end of the cable is connected to an external device (for example, a PC), information communications between the camera and the external device become available. Moreover, when a memory card (not shown) is inserted into the card connector 310, a taken image can be recorded to the memory card, and a taken image recorded in the memory card can be read and displayed on the display section 70.

Figure 6:
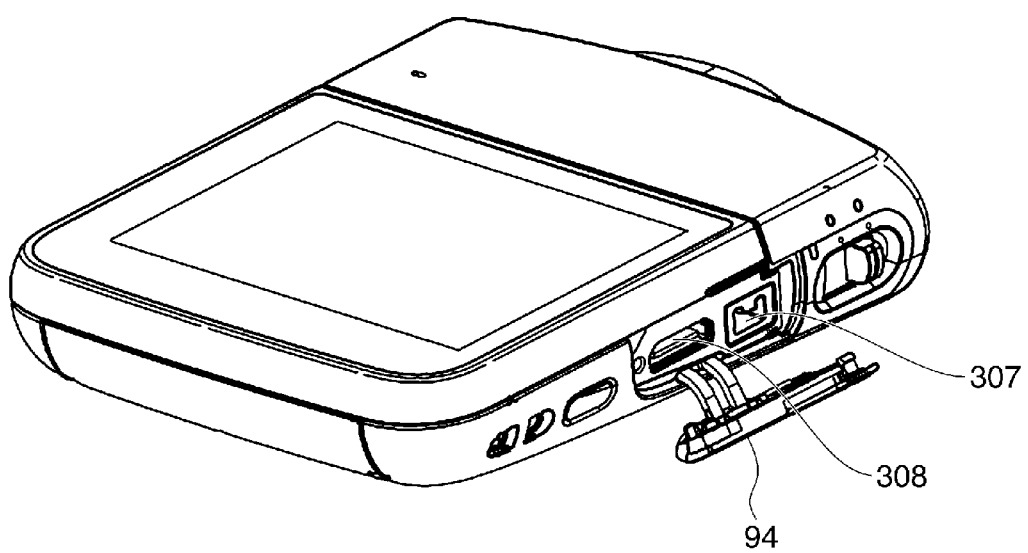
FIG. 6 is a perspective view showing the digital camera shown in FIG. 1 in a state where a jack lid opens with respect to a camera body.

FIG. 6 is a perspective view showing a state where the jack lid 94 opens with respect to the camera body 4. As shown in FIG. 6, when the jack lid 94 is opened, a DC terminal 307 and a video terminal 308 appear. The DC terminal 307 and the video terminal 308 are implemented on the main substrate mentioned later.

The video terminal 308 is an HDMI (registered trademark) terminal, for example. When one end of a video communication cable (for example, an HDMI (registered trademark) cable, not shown) is connected to the video terminal 308 and the other end of the cable is connected to an external device (for example, a television), video communications between the camera and the external device become available.

Figure 7:
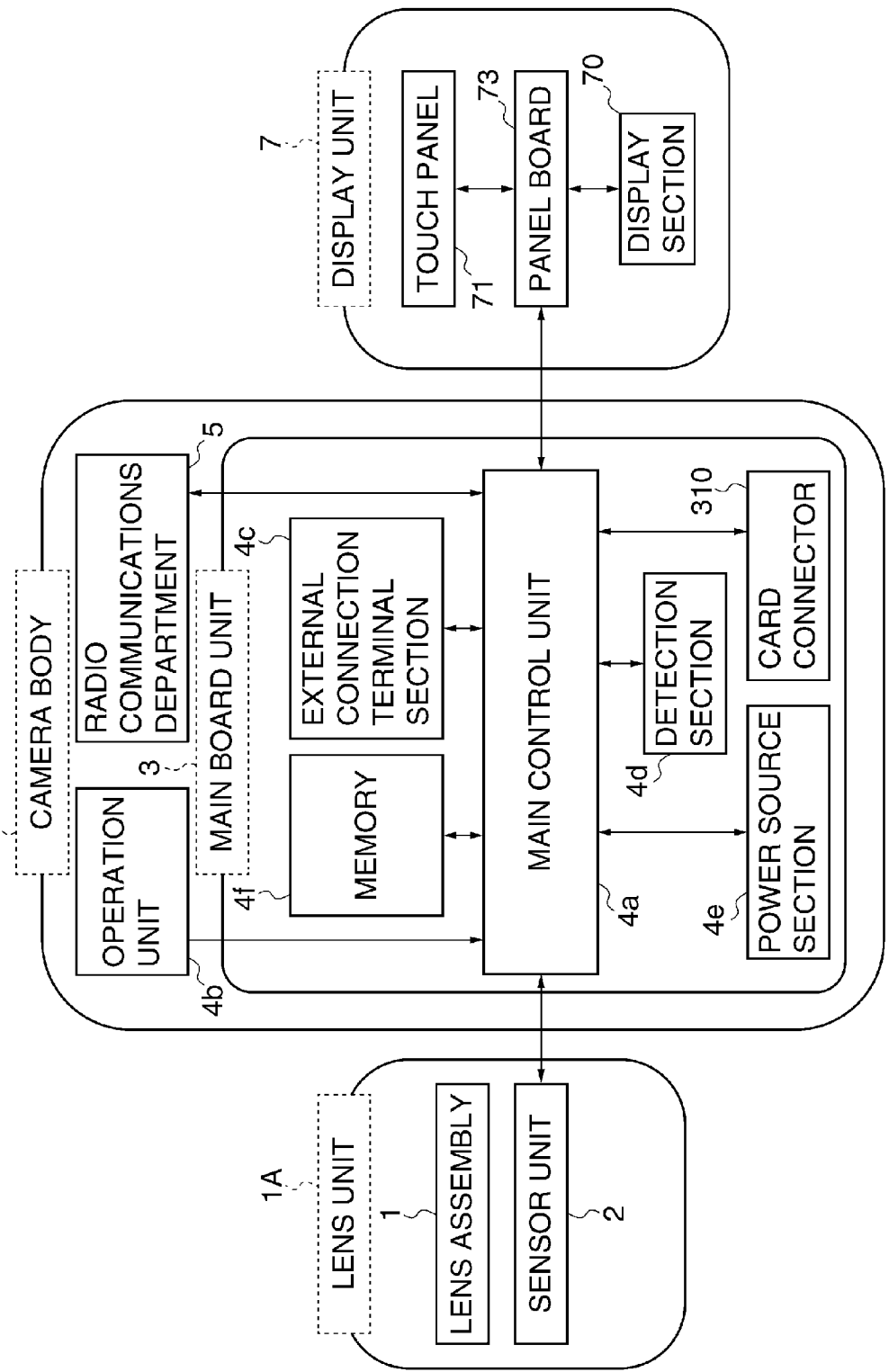
FIG. 7 is a block diagram schematically showing a control system of the digital camera shown in FIG. 1.

FIG. 7 is a block diagram schematically showing a control system of the digital camera. As are shown in FIG. 7, a lens unit 1A contains the lens assembly 1 and the sensor module 2. As mentioned above, subject light that enters into the lens assembly 1 forms an image on an image pickup device included in the sensor module 2 and is converted photoelectrically.

The camera body 4 is provided with a main board unit 3, an operation unit 4b, and a radio communications department 5. The main board unit 3 has a main control unit 4a, a power source section 4e, a detection section 4d, an external connection terminal section 4c, a card connector 310, and a memory 4f.

The main control unit 4a performs input and output of image sound information, image processes, such as compression and conversion, recording/reproducing processes, etc. while communicating with the memory 4f that is implemented on the main board unit 3. The main control unit 4a includes a main IC, a power IC, an audio IC, etc. that will be mentioned later.

When image information is outputted to the main control unit 4a from the sensor module 2, the main control unit 4a applies an image process to this image information. Moreover, the main control unit 4a controls the lens unit 1A according to the transmitted image information. For example, the main control unit 4a operates a diaphragm unit mentioned later to adjust brightness of a taken image. When recording a taken image, the main control unit 4a transmits image information to the card connector 310, and makes the taken image record into a memory card.

The power source section 4e includes the DC terminal 307 and the battery terminal 306. The DC terminal 307 is connectable with an external power source through an external power source cable. Moreover, the battery terminal 306 is connectable with a battery of a power unit mentioned later. The power obtained by the power source section 4e is transmitted to the main control unit 4a. The main control unit 4a converts the transmitted power into voltage appropriate to each drive element, and transmits the converted power to each drive element.

The detection section 4d includes a below-mentioned barrier detection switch. The barrier detection switch detects opening-closing actions of the barrier 410 dependent on an operation of the power knob 45. Opening-closing information about the barrier 410 is transmitted to the main control unit 4a.

The external connection terminal section 4c includes the video terminal 308 and the information communicating terminal 309. When an external connection cable is connected to the external connection terminal section 4c, each terminal detects the connection and transmits a detection signal to the main control unit 4a. The main control unit 4a controls input and output of image information, etc. according to the connected external connection cable.

The operation unit 4b includes the release knob 92 and the reproduction knob 82. When the operation unit 4b is operated, a release switch, a reproduction switch, etc. (mentioned later) that are implemented on the main board unit 3 detect the operation, and transmit operation information to the main control unit 4a. The main control unit 4a changes a mode to an image recording mode or a reproduction mode based on this operation information.

The radio communications department 5 has a wireless module that can communicate with an external radio device. When the wireless communication information is transmitted to the main control unit 4a from the wireless module, the main control unit 4a controls a wireless communication like input and output of image information, etc.

The display unit 7 has a touch panel 71, a panel board 73, and the display section 70 like an LCD. The panel board 73 is connected to the main control unit 4a, and exchanges information with the main control unit 4a. For example, the image information taken by the lens unit 1A is transmitted to the main control unit 4a. After applying an image process to the image information, the main control unit 4*a* transmits the image information to the panel board 73.

The panel board 73 displays the transmitted image information on the display section 70. Moreover, when a user operates the touch panel 71, the operation information is transmitted to the main control unit 4*a* through the panel board 73, and the main control unit 4*a* performs a specified control according to the transmitted operation information.

Figure 8:
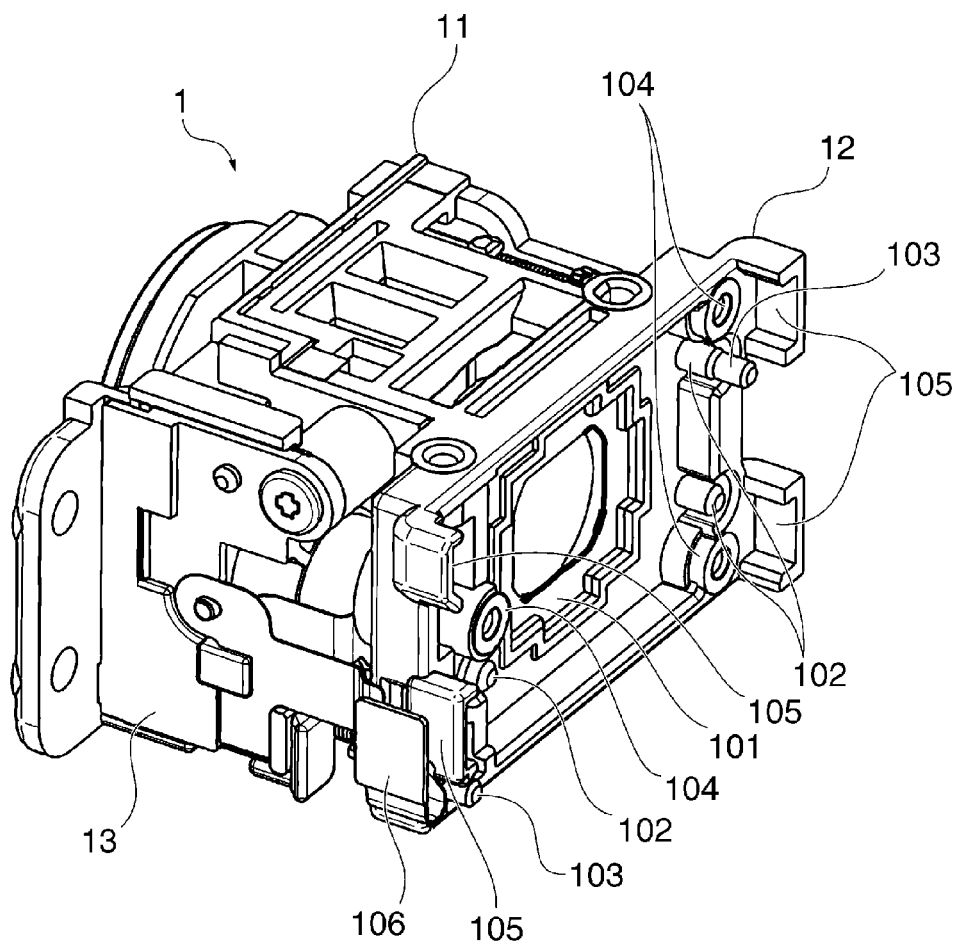
FIG. 8 is a perspective view showing a lens assembly of the digital camera shown in FIG. 1.
Figure 9:
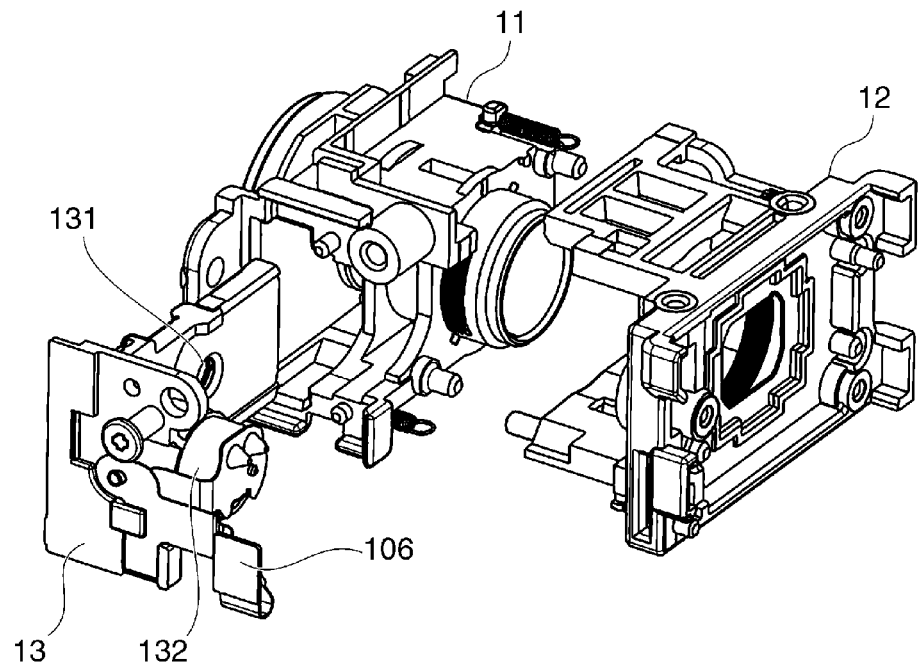
FIG. 9 is an exploded perspective view showing the lens assembly shown in FIG. 8.
Figure 10:
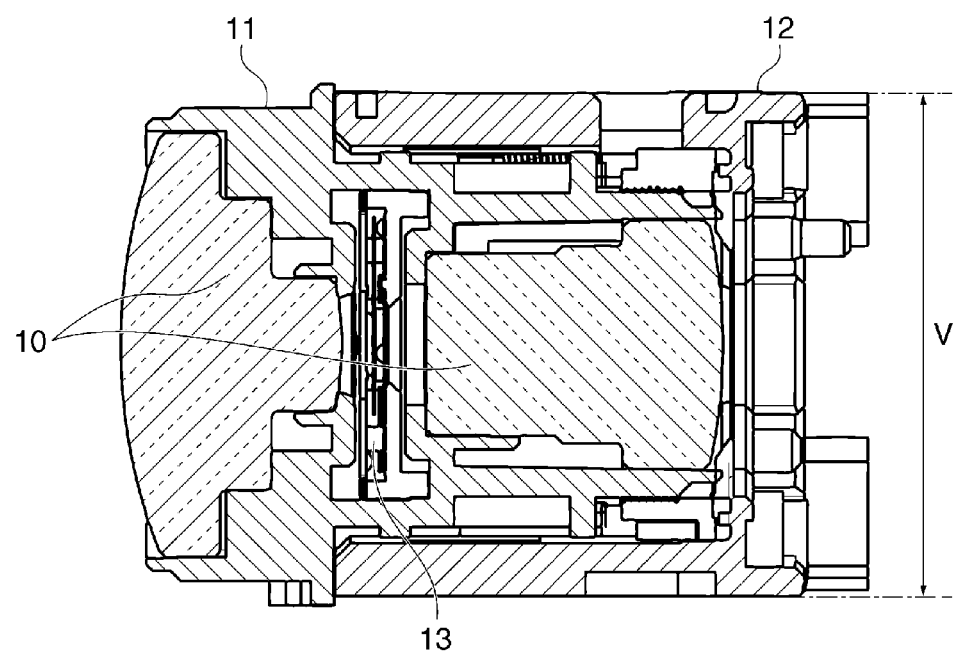
FIG. 10 is a sectional view in an optical axis direction showing the lens assembly shown in FIG. 8.

FIG. 8 is a perspective view showing the lens assembly 1. FIG. 9 is an exploded perspective view showing the lens assembly 1. FIG. 10 is a sectional view in an optical axis direction showing the lens assembly 1.

A taking lens 10 consists of two lens groups as shown in FIG. 10, and enables wide angle shooting because its diagonal field angle is 170 degrees. This taking lens 10 is fixed to a front sleeve 11 by caulking in a state where the position in the optical axis direction and the inclination are adjusted with respect to the front sleeve 11. Moreover, the rear part of the front sleeve 11 is inserted inside a rear sleeve 12, which holds the sensor module 2 at the rear side, so as to be slidable in the optical axis direction of the taking lens 10. The focus of the taking lens 10 with respect to the image pickup device of the sensor module 2 can be adjusted by sliding the front sleeve 11 in the optical axis direction with respect to the rear sleeve 12. Moreover, the size V of the lens assembly 1 shown in FIG. 10 in the vertical direction is determined so as to hold the taking lens of which the diagonal field angle is 170 degrees.

As shown in FIG. 8, an LPF-oriented concave portion (a concave portion for a Low Pass Filter) 101 is provided in the rear side of the rear sleeve 12, and three rubber positioning bosses 102 and two plate positioning bosses 103 are provided around the LPF-oriented concave portion 101 so as to be projected toward the rear side.

Moreover, three sensor screw bosses 104 consisting of tap prepared holes are provided in the rear side of the rear sleeve 12, and sensor bonded parts 105 are provided at four corners of the rear side of the rear sleeve 12. A diaphragm flexible printed circuit board (referred to as a diaphragm FPC, hereafter) 106 electrically connects a diaphragm unit 13 with the main board unit 3.

As shown in FIG. 9, the diaphragm unit 13 that has a plurality of diaphragm blades 131 is nearly L shape when viewed from the upper side, and is incorporated into the front sleeve 11 so that one side of the L shape having the diaphragm blades 131 is inserted into the front sleeve 11.

The diaphragm blades 131 of the diaphragm unit 13 are inserted between the two lens groups of the taking lens 10, as shown in FIG. 10. In this position, the diaphragm unit 13 adjusts a light amount that the image pickup device of the sensor module 2 receives by opening and closing the diaphragm blades 131.

As shown in FIG. 9, an actuator 132 that drives the diaphragm unit 13 is arranged on the other side of the L shape of the diaphragm unit 13 so that a longitudinal direction becomes parallel to the optical axis.

Since the actuator 132 is arranged on the side of the lens assembly 1 so that its longitudinal direction becomes parallel to the optical axis in this way, the size V of the lens assembly 1 in the vertical direction can be reduced.

Figure 11:
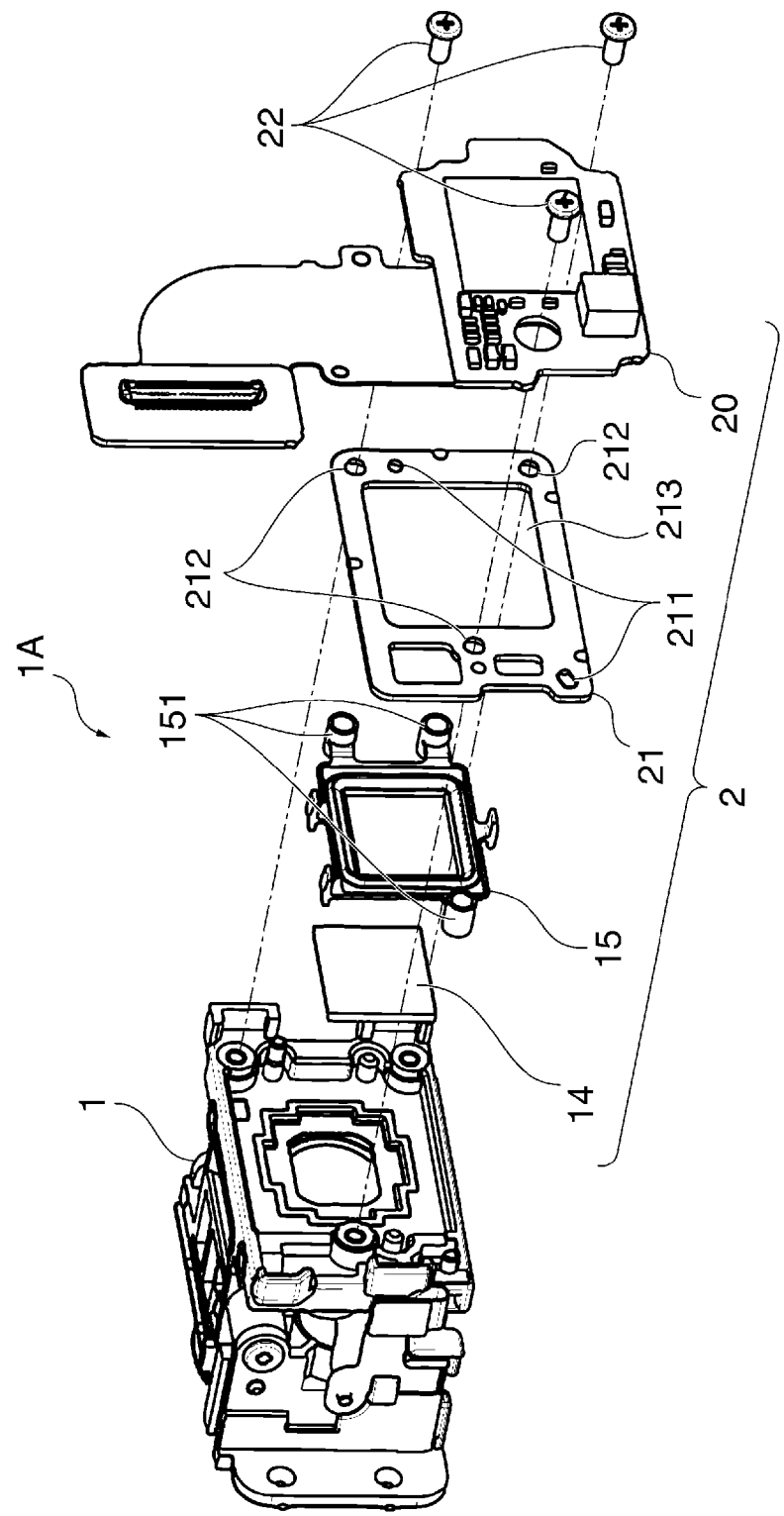
FIG. 11 is an exploded perspective view showing a lens unit of the digital camera shown in FIG. 1.
Figure 12:
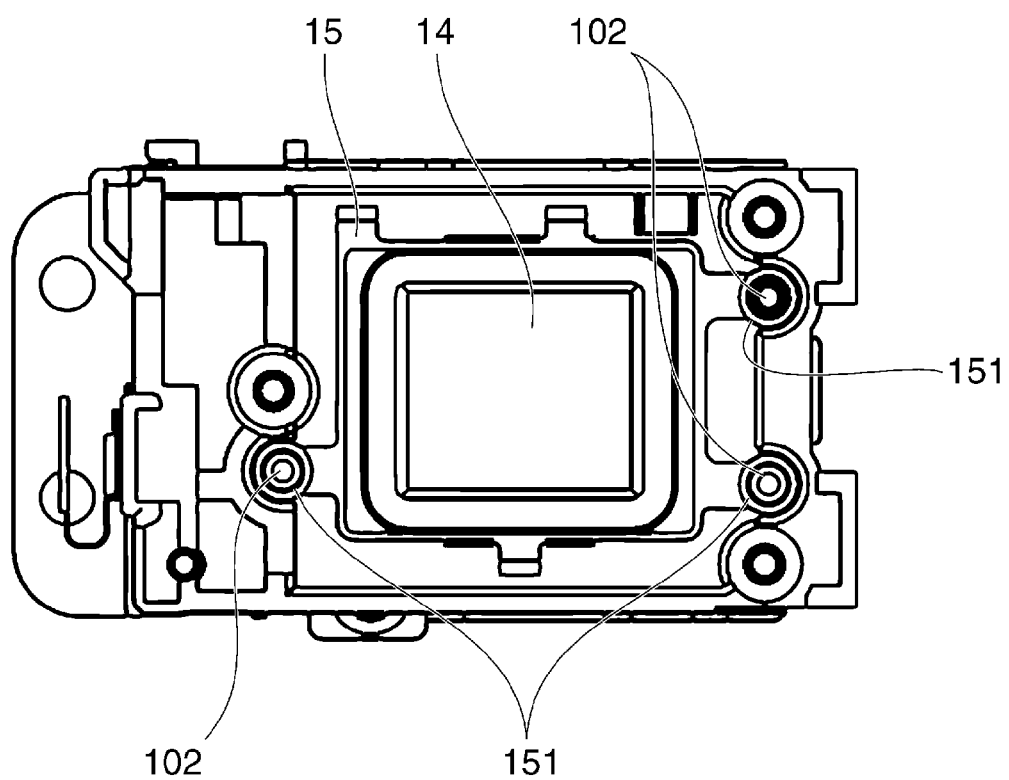
FIG. 12 is a view showing a state where a LPF (Low Pass Filter) and a sensor rubber have been incorporated to a rear side of a rear sleeve of the lens assembly shown in FIG. 8.

FIG. 11 is an exploded perspective view showing the lens unit 1A. FIG. 12 is a view showing a state where an LPF (optical low pass filter) 14 and a sensor rubber 15 have been incorporated to the rear side of the rear sleeve 12 of the lens assembly 1.

As shown in FIG. 11 and FIG. 12, the sensor module 2 has the LPF 14, the sensor rubber 15, a sensor plate 21, and a sensor substrate 20. The LPF 14 cuts a high frequency component of a beam that is incident on the taking lens 10 in order to prevent interference fringes and false colors from occurring in a taken image.

Three cylindrical rubber charge parts 151 are formed in the sensor rubber 15. The sensor plate 21 holds the sensor substrate 20, and the image pickup device mentioned later is implemented on the sensor substrate 20.

A pair of sensor positioning holes 211 formed in a circular hole and an oblong hole and a pair of sensor-screw holes 212 are formed in the sensor plate 21. Moreover, a plate opening part 213 that is deviated outward from the contour of the image pickup device in a specified quantity is formed in the center of the sensor plate 21. The sensor plate 21 is fixed to the rear side of the rear sleeve 12 with sensor screws 22.

The LPF 14 is incorporated in the LPF-oriented concave portion 101 of the rear sleeve 12. The sensor rubber 15, which is formed in rectangular shape, is incorporated in the rear sleeve 12 while positioning with respect to the rear sleeve 12 by fitting the three rubber positioning bosses 102 of the rear sleeve 12 to insides of the three cylindrical rubber charge parts 151, respectively.

A projection (not shown) toward the LPF 14 is formed along the whole outer circumference of the sensor rubber 15 at the side of the LPF 14. When the sensor plate 21 is built into the rear sleeve 12 in a later assembling step, the sensor rubber 15 will deform elastically in a specified quantity, and will be pushed to the rear sleeve 12.

At this time, since the above-mentioned projection provided in the sensor rubber 15 charges the LPF 14, the LPF 14 is closely fitted to the rear sleeve 12 and is held, which prevents penetration of the garbage to the lens assembly 1.

FIG. 13A is a front view showing the sensor substrate 20. FIG. 13B is a back view showing the sensor substrate 20. As shown in FIG. 13A and FIG. 13B, the image pickup device 200 is implemented on the front side, i.e., the side of the lens assembly 1, of the sensor substrate 20, and photoelectrically converts a subject image formed through the taking lens 10 into an electrical signal (image information). A rigid section 201 has specified rigidity and forms a part on which the image pickup device 200 is implemented in the sensor substrate 20. The rigid section 201 is equivalent to an example of the device substrate of the present invention.

A copper foil exposed area 204 for dissipating heat from the image pickup device 200 is provided on a back face (i.e., the side opposite to the side on which the image pickup device 200 is provided) of the rigid section 201. The copper foil exposed area 204 is formed in the nearly same area as the projection area of the image pickup device 200. The copper foil exposed area 204 exposes the copper foil inside the substrate by exfoliating protective layers, such as a resist layer, which cover the rigid section 201.

Heat generated by the image pickup device 200 conducts to the copper foil exposed area 204 directly. Accordingly, the copper foil exposed area 204 is heated as the temperature of the image pickup device 200 increases. Since the copper foil exposed area 204 is formed in the nearly same area as the projection area of the image pickup device 200, the area can uniformly dissipate the heat of an image pickup surface of the image pickup device 200, which can prevent temperature unevenness from generating on the image pickup surface. The copper foil exposed area 204 is equivalent to an example of the heat dissipation section of the present invention.

The rigid section 201 has an extended portion 201*a* that is extended to one side (left side in FIG. 13B in this embodiment) in the horizontal direction with respect to the center position of the image pickup device 200. The length between the center position and the edge of the extended portion 201a is longer than the length between the center position and the other edge. A through hole 205 is formed in the extended portion 201a, and electronic components 206 for the image pickup device 200 are mounted on the extended portion 201a.

As shown in FIG. 13B, the extended portion 201a is narrower than the other portion by a size i to form a step. An FPC 202 is pulled out from the extended portion 201. Accordingly, a flexure margin of the FPC 202 required when the FPC 202 bends to connect with the main substrate 30 in a later step is reserved, which enables to reduce reaction force applied to the sensor substrate 20. One end of the FPC 202 is connected to the rigid section 201, and the other end is connected to a connector rigid portion 203. The connector rigid portion 203 has specified rigidity, and is provided with a connector 207 connected to the main board unit 3 on the back side.

The image pickup device 200 is configured as a CSP (Chip Size Package), has an LGA (Land Grid Array) as electrode pads on almost all the back face, and is implemented so as to be closely fitted to the rigid section 201 of the sensor substrate 20 in this embodiment.

The image pickup device 200 is implemented to the sensor substrate 20 by an automatic packaging machine, and is united with the sensor substrate 20. Image information, which is obtained by photoelectrically converting an image formed on the image pickup surface of the image pickup device 200, is pulled out from internal signal lines of the image pickup device 200 through image data signal patterns of the rigid section 201, and is transmitted to the electronic components 206 that are connected to the image data signal patterns and to the connector 207 through the FPC 202.

The sensor substrate 20 requires a specified area in order to have to reserve an area in which the signal patterns that pull out signals from the image pickup device 200, and an area in which the electronic components 206 are implemented. On the other hand, it is necessary to arrange several kinds of parts within the height size V of the lens assembly 1 for thinning the camera body 4 as mentioned above.

Accordingly, in this embodiment, the external shape of the rigid section 201 of the sensor substrate 20 is extended to one side (left side in FIG. 13B in this embodiment) in the horizontal direction with respect to the center position of the image pickup device 200 to form the extended portion 201a. Since the electronic components 206 are provided in the extended portion 201a, the required area can be reserved without enlarging the vertical size of the sensor substrate 20.

Moreover, since the rigid section 201 is configured as mentioned above, even when the through hole 205 is formed in the rigid section 201, the image signal patterns and the electronic components 206 are appropriately arranged.

In a later step, the sensor screw 22 is inserted through the through hole 205 at the time of tilt adjustment for the image pickup device 200. Moreover, the diameter of the through hole 205 is larger than the diameter of the screw head of the sensor screw 22. It should be noted that a description of the tilt adjustment for the image pickup device 200 is omitted because it is a well-known technique.

Figure 15:
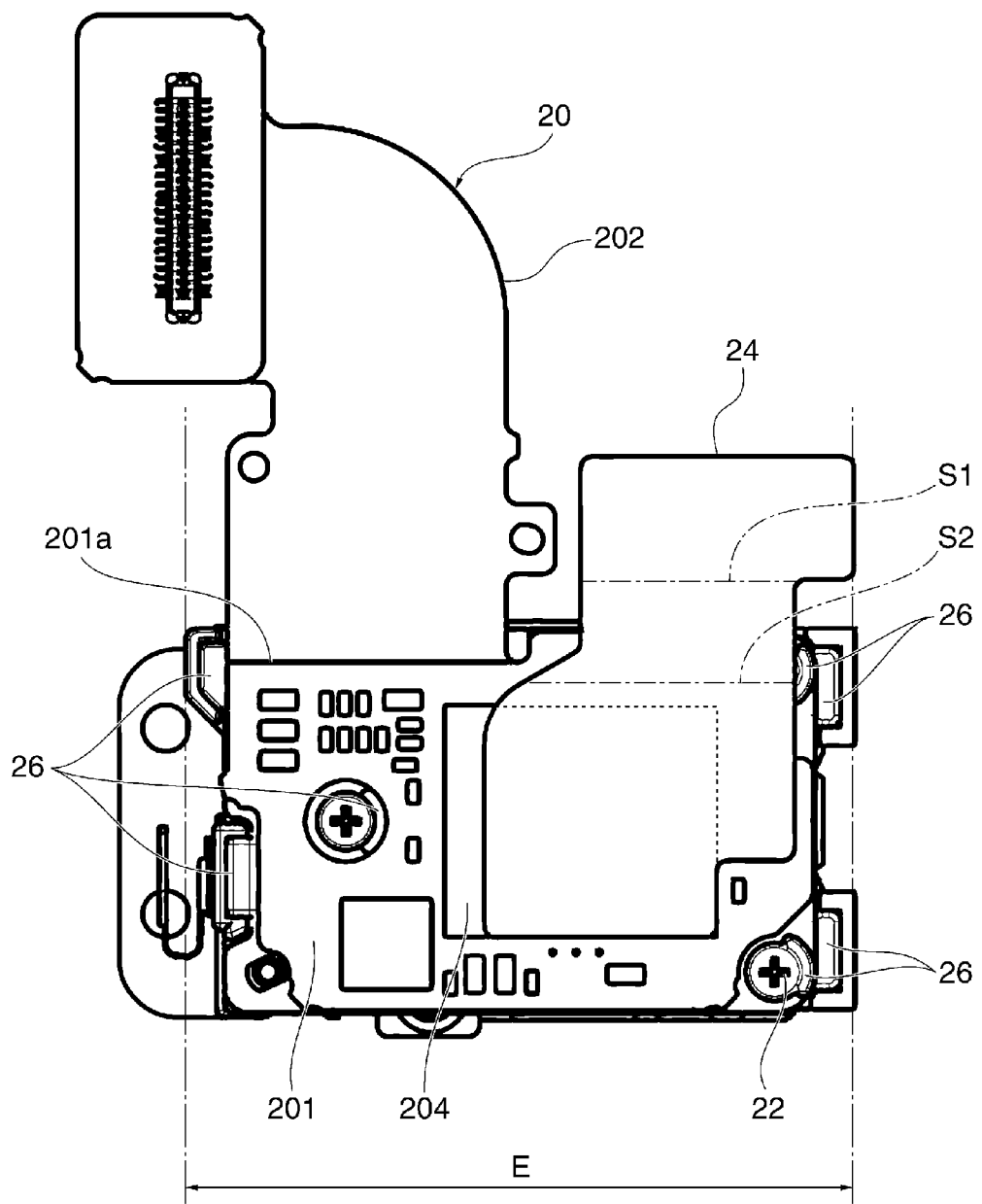
FIG. 15 is a back view showing a state where the sensor substrate and the sensor plate shown in FIG. 14A are fixed to the lens assembly shown in FIG. 8.

FIG. 14A is a front view showing a state where the sensor substrate 20 is adhered and fixed to the sensor plate 21. FIG. 14B is a right side view of FIG. 14A. FIG. 15 is a back view showing a state where the sensor substrate 20 and the sensor plate 21 are fixed to the lens assembly 1.

After performing the tilt adjustment for the image pickup device 200, the sensor plate 21 is adhered to the rear sleeve 12 of the lens assembly 1 with adhesive bond 26, and the sensor screws 22 are also adhered to the sensor plate 21 with the adhesive bond 26, so that the sensor substrate 20 to which the sensor plate 21 is adhered is fixed to the lens assembly 1.

As shown in FIG. 15, a heat dissipation sheet 24 is pasted on the copper foil exposed area 204. The heat dissipation sheet 24 is arranged side by side with the FPC 202 of the sensor substrate 20. While the FPC 202 is connected to the rigid section 201 at the position that is deviated to one side (left side) from the center of the image pickup device 200, the heat dissipation sheet 24 is arranged on the rigid section 201 at the side (right side) of the image pickup device 200. Such an arrangement enables the compact arrangement of the image signal transfer area and the heat dissipation configuration for the image pickup device 200 within a size E of the lens assembly 1 in the horizontal direction.

It is desirable that the heat dissipation sheet 24 is made from material that is high in heat conductivity and thin, such as a copper foil sheet and a graphite sheet. A double-stick tape is pasted on the copper foil exposed area 204 in an area below a lower alternate long and short dash line S2 of the heat dissipation sheet 24.

Moreover, a double-stick tape is pasted on the front exterior of the camera body 4 above an upper alternate long and short dash line S1 of the heat dissipation sheet 24. When a heat dissipation is taken into consideration, it is desirable that the thickness of the double-stick tape is less than 10 µm. Moreover, the heat dissipation sheet 24 is pasted after the applied adhesive bond 26 has hardened. It should be noted that the thickness of the heat dissipation sheet 24 is about 35 µm in this embodiment.

Then, the heat generated by the image pickup device 200 is conducted from an internal layer of the rigid section 201 to the heat dissipation sheet 24 through the copper foil exposed area 204, and then, the heat is conducted from the heat dissipation sheet 24 to the front cover 40, which is the front exterior of the camera body 4, and diffuses into the open air.

Thereby, the heat generated by the image pickup device 200 can diffuse into the open air promptly, and it becomes possible to suppress the temperature rise of the image pickup device 200 satisfactorily. When the heat dissipation to the open air is taken into consideration, it is desirable that the front cover 40 is made from material that is excellent in thermal conductivity, such as pure aluminum-base material and aluminum alloy material.

Figure 16A:
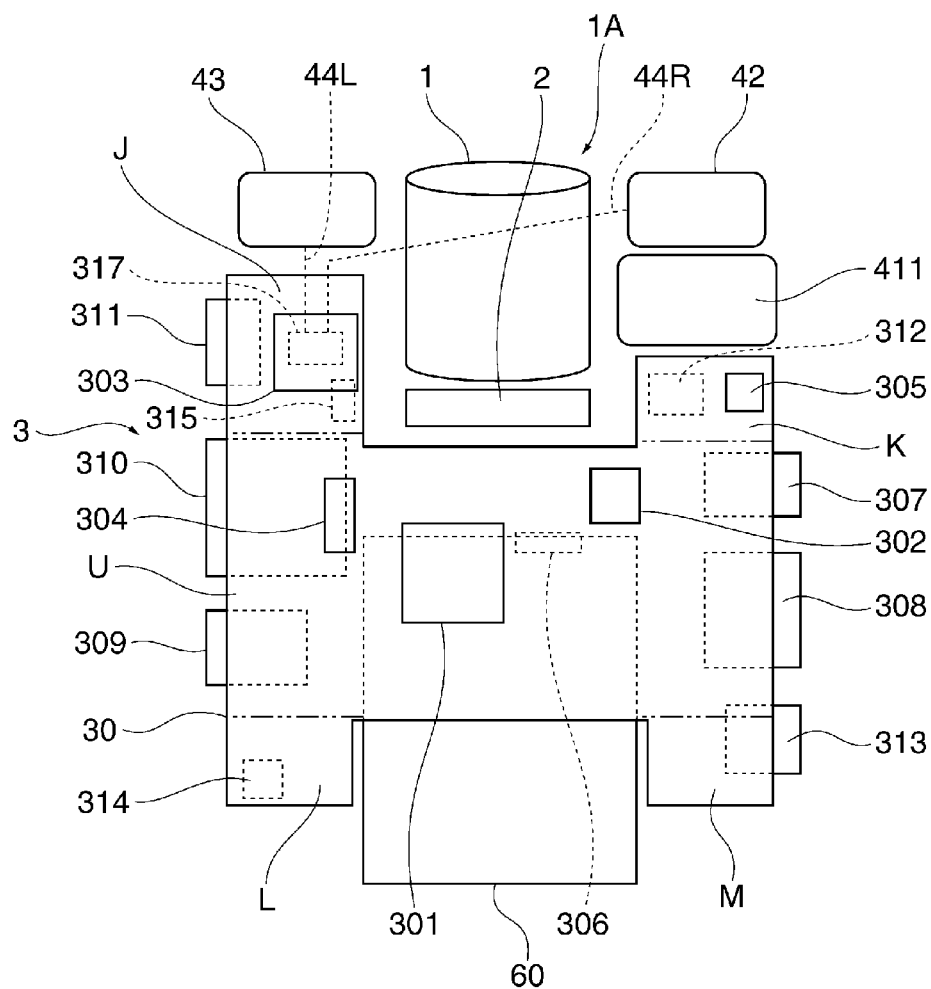
FIG. 16A is a schematic view showing a positional relationship between the lens unit and a main board unit of the digital camera shown in FIG. 1 viewed from the top side of the camera body.
Figure 16B:
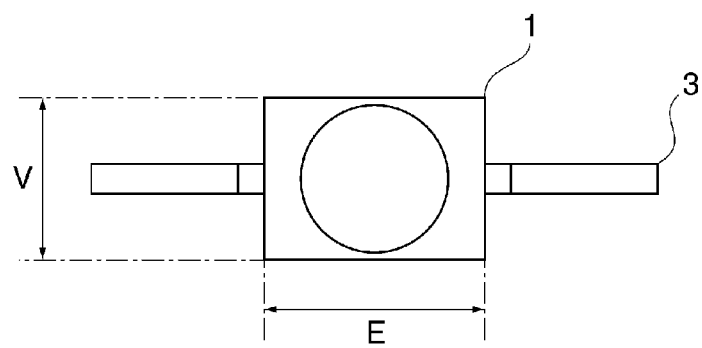
FIG. 16B is a schematic view showing a positional relationship between the lens unit and the main board unit of the digital camera shown in FIG. 1 viewed from the front side of the camera body.
Figure 17:
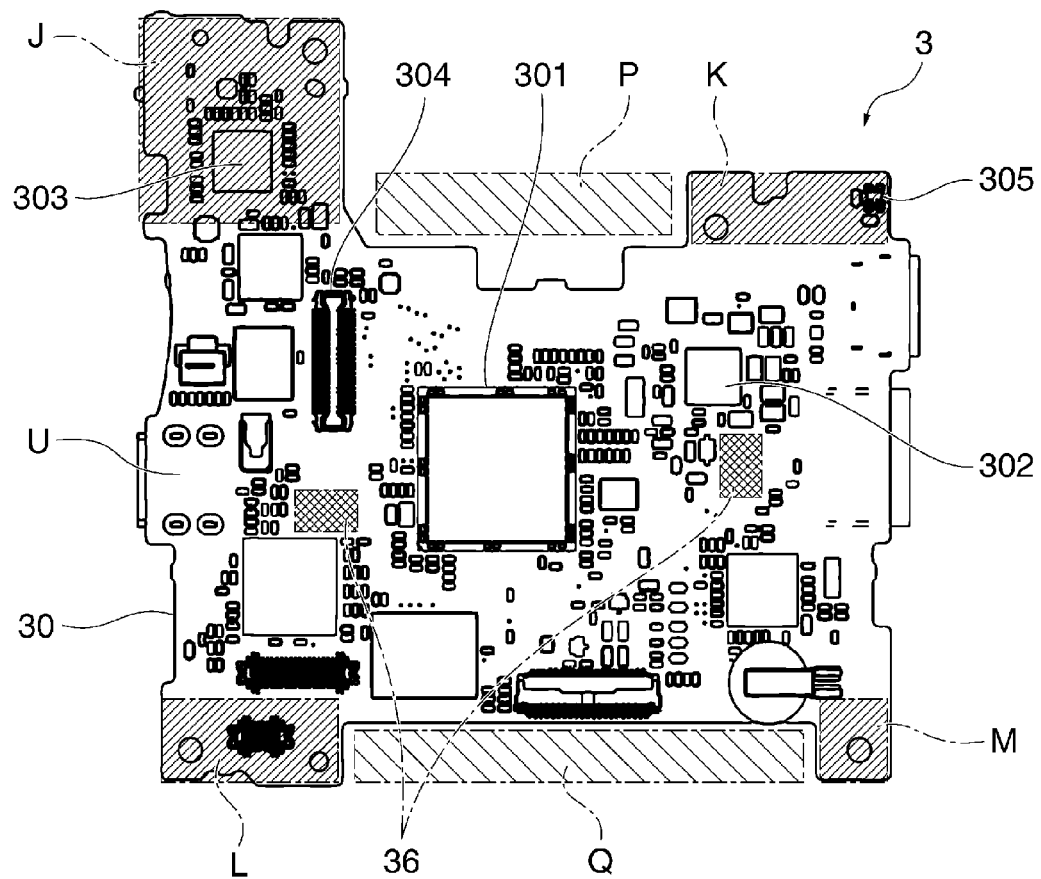
FIG. 17 is a view showing the main board unit of the digital camera shown in FIG. 1 viewed from the top side of the camera body.
Figure 18:
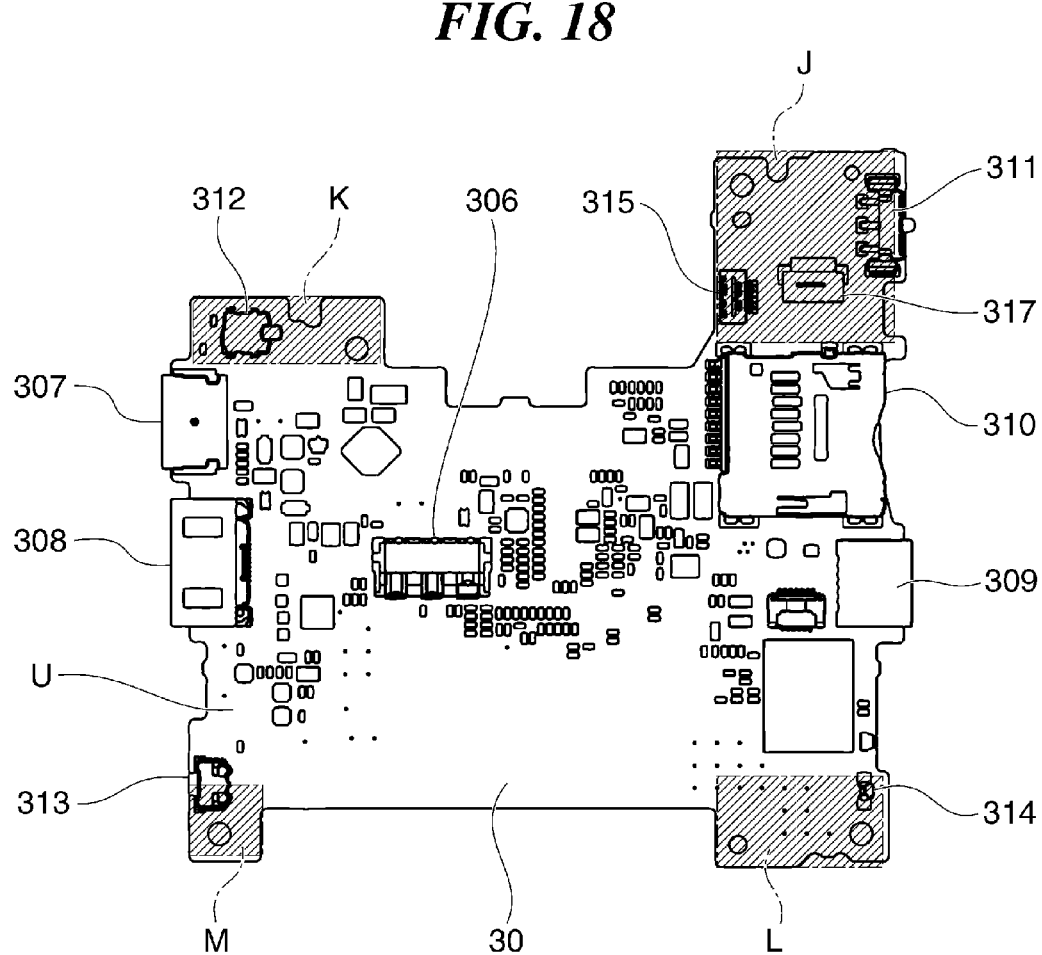
FIG. 18 is a view showing the main board unit of the digital camera shown in FIG. 1 viewed from the bottom side of the camera body.

FIG. 16A is a schematic view showing a positional relationship between the lens unit 1 and the main board unit 3 viewed from the top side of the camera body 4. FIG. 16B is a schematic view showing a positional relationship between the lens unit 1A and the main board unit 3 viewed from the front side of the camera body 4. FIG. 17 is a view showing the main board unit 3 viewed from the top side of the camera body 4. FIG. 18 is a view showing the main board unit 3 viewed from the bottom side of the camera body 4. In FIG. 16A, components shown in FIG. 17 that are implemented on the upper side of the main board unit 3 are represented by solid lines, and components shown in FIG. 18 that are implemented on the lower side of the main board unit 3 are represented by broken lines.

As shown in FIG. 16B, the plate-like main board unit 3 is arranged so as to be approximately perpendicular to the height direction within the vertical size V of the lens assembly 1.

Moreover, the main board unit 3 is divided into regions J, K, L, M, and U, as shown in FIG. 16A, FIG. 17, and FIG.

18. The regions J, K, L, and M are extended to the an optical axis direction of the lens assembly 1 from four corners of the central region U. The lens unit 1A is arranged in a notch P (see FIG. 17) prepared between the regions J and K, and a battery 60 is arranged in a notch Q prepared between the regions L and M. Such an arrangement enables to use the right and left spaces of the lens unit 1A effectively and to reserve the implement area on the main board unit 3. According to such an arrangement, the camera body 4 can become thinner than the sum of the height of the lens unit 1A and the thickness of the main board unit 3 in the vertical direction.

In the region U, the battery terminal 306, the DC terminal 307, the video terminal 308, the information communicating terminal 309, and the card connector 310 are arranged.

As shown in FIG. 17, the main IC 301 is arranged approximately in the center of the region U at the upper side of the main substrate 30.

The main IC 301, a power IC 302, and a connector 304 are arranged in the central region U at the upper side of the main board unit 3. The battery terminal 306, the DC terminal 307, the video terminal 308, the information communicating terminal 309, and the card connector 310 are arranged in the central region U at the lower side.

Each of these components requires a specified area including an area for a peripheral circuit, when the component is implemented to the main substrate 30.

Since the main IC 301 is electrically connected with each component on the main board unit 3 and is large in the component size, it is desirable to be arranged at the center of the main board unit 3. Since the connector 304 is connected to the connector 207 of the sensor substrate 20, it needs to be arranged near the sensor module 2. Power supply signals supplied from the battery 60 and the external power source through the battery terminal 306 and the DC terminal 307 are supplied to the power IC 302 through the power supply pattern formed on the main board unit 3.

In order to prevent this power supply signals from affecting signals that flow through signal patterns of other implemented components of the main substrate 30, the battery terminal 306 and DC terminal 307 need to be arranged near the power IC 302, and it is necessary to reserve a specific area for arranging these components on the main substrate 30.

Similarly, since the information communicating terminal 309 and the video terminal 308 need to be arranged near ICs that control signals from the respective terminals, specified areas are needed. Moreover, the card connector 310 needs a specified area for storing a memory card. Because of such reasons, the above-mentioned components are arranged in the region U that has a comparatively large area.

On the other hand, since the regions J, K, L, and M are comparatively small areas due to the existence of the notches P and Q, they are suitable for arranging small components each of which is self-contained component with a small circuit structure. Moreover, since the regions J, K, L, and M include sections that are close to the right-and-left externals of the camera body 4, they are suitable for arranging interface components with the outside.

In the region J, an audio IC 303 that applies an audio signal process like an A/D conversion etc. to an audio signal inputted from the microphones 42 and 43 is arranged on the upper side, and a release switch 311, a microphone wire connector 317, and an diaphragm FPC connector 315 are arranged at the lower side. The diaphragm FPC connector 315 is connected with the diaphragm FPC 106. The release switch 311 is equivalent to an example of an operation switch of the present invention. Moreover, in the region K, a power LED 305 is arranged at the upper side, and a barrier detection switch 312 is arranged at the lower side. An access LED 314 is arranged at the lower side in the region L, and a reproduction switch 313 is arranged at the lower side in the region M. The access LED 314 turns ON and OFF according to performs lighting and putting out lights according to presence and condition of the communication with a memory card inserted in the card connector 310.

The power LED 305, the access LED 314, the release switch 311, the barrier detection switch 312, and the reproduction switch 313 are self-contained components that do not require large-scale peripheral processing circuits and are used as user interfaces. Accordingly, they are optimal to be arranged in the regions J, K, L, and M. Moreover, since the microphone wire connector 317 must be arranged near the audio IC 303, they are arranged at the upper side and the lower side in the region J, respectively. Dampers 36 are made from elastic material like sponge, and are pasted on the upper side of the main substrate 30 as shown in FIG. 17.

Figure 19:
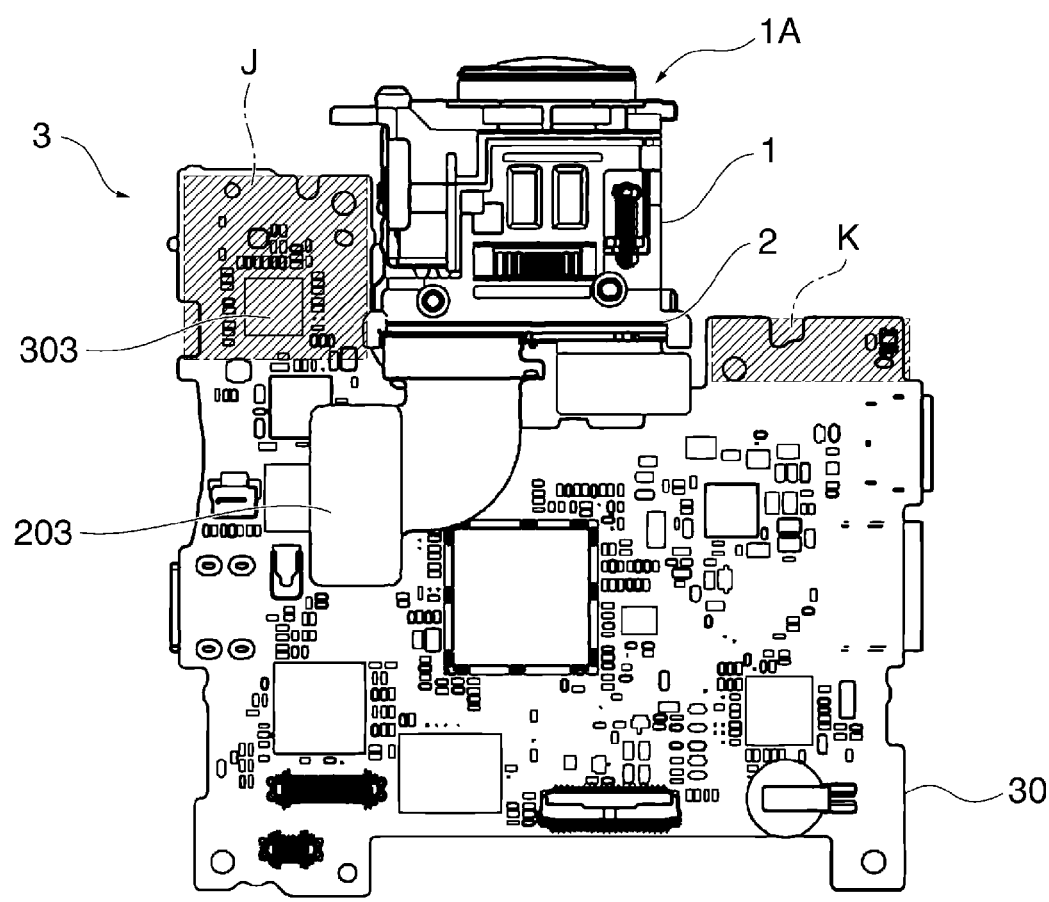
FIG. 19 is a schematic view showing the positional relationship between the lens unit and the main board unit of the digital camera shown in FIG. 1 viewed from the top side of the camera body.
Figure 20:
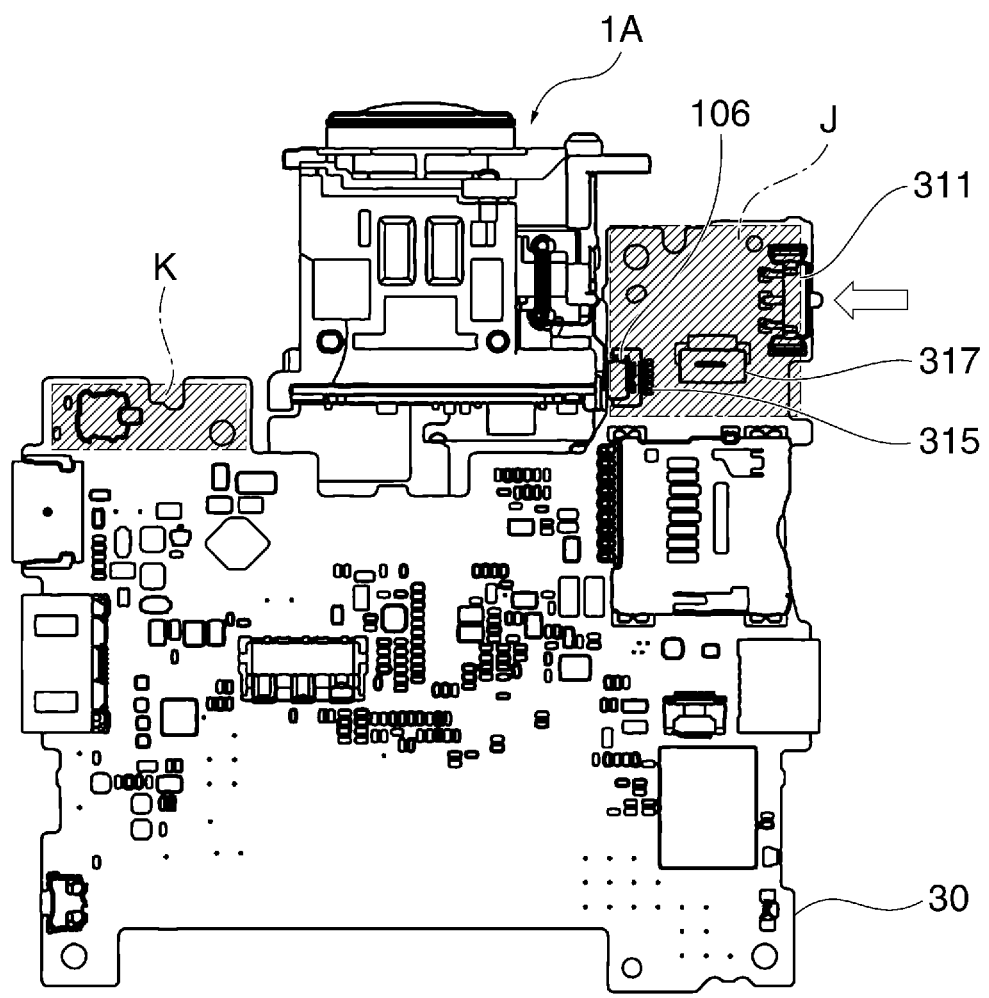
FIG. 20 is a schematic view showing the positional relationship between the lens unit and the main board unit of the digital camera shown in FIG. 1 viewed from the bottom side of the camera body.

FIG. 19 is a view showing a positional relationship between the lens unit 1A and the main board unit 3 viewed from the top side of the camera body 4. FIG. 20 is a view showing the positional relationship between the lens unit 1A and the main board unit 3 viewed from the bottom side of the camera body 4. As shown in FIG. 19 and FIG. 20, the main substrate 30 that constitutes the main board unit 3 is arranged so that the implementing surface of the main substrate 30 is approximately perpendicular to the surface to which the image pickup device 200 is implemented of the sensor substrate 20.

Moreover, as shown in FIG. 20, the release switch 311 is operated in the direction (shown by an arrow in FIG. 20) that is approximately perpendicular to the optical axis. The release switch 311 is positioned to face the rerelease knob 92, and is operated when a user pushes the release knob 92 with a thumb etc.

As mentioned above, the release switch 311 used at the time of shooting is arranged beside the lens assembly 1 so that the release switch 311 is operated in the direction that is approximately perpendicular to the optical axis and is approximately perpendicular to the height direction of the lens unit 1A in this embodiment. This can prevent the lens assembly 1 from rotating around the optical axis due to an operation of the release knob 92 at the time of shooting, and can reduce a camera shake at the time of a shooting operation.

Moreover, when a user holds the camera body 4, the user pushes the release knob 92 with the thumb and supports the surface opposite to the operation surface with the index finger. Accordingly, a camera shake at the time when the user pushes the release knob 92 can be reduced. Furthermore, if the release switch 311 is implemented to the main substrate 3 instead of another exclusive board, it is possible to reduce the cost.

As shown in FIG. 16A, the microphone 43 is arranged at the front side of the camera body 4 in front of the region J of the main substrate 30, and the microphone 42 is arranged at the opposite side of the microphone 43 via the lens unit 1A. The microphone 43 is connected to the microphone wire connector 317 through a microphone wire 44L, and the microphone 42 is connected to the microphone wire connector 317 through a microphone wire 44R.

Since the sounds collected with the microphone 42 and the microphone 43 are outputted from the microphone 42 and the microphone 43 as analog audio signals, they are easily affected by other electrical signals. If a noise is superimposed on an analog audio signal, audio signal quality deteriorates. Accordingly, it is necessary to avoid transmitting the analog audio signal through signal line patterns inside the main substrate 30.

Moreover, it is desirable to shorten the connecting distance between the microphones 42, 43 and the microphone wire connector 317 on the main substrate 30 through the microphone wires 44R and 44L as much as possible.

Accordingly, the main substrate 30 has the region J that is extended towards the microphone 43, and the microphone wire connector 317 is arranged in the region J in this embodiment. Thereby, the analog audio signal that is outputted from the microphone 43 is transmitted to the microphone wire connector 317 through the microphone wire 44L with the minimum distance without transmitting through signal line patterns inside the main substrate 30.

On the other hand, a barrier drive unit 411 that drives the barrier 410 to open and close is arranged at the side of the microphone 42. Accordingly, the main substrate 30 cannot be sufficiently extended towards the microphone 42 at the side of the microphone 42, and the wide area cannot be reserved for the region K. For this reason, it is appropriate to arrange the microphone wire connector 317 and the audio IC 303 in the region J that is opposite to the barrier drive unit 411 via the lens assembly 1.

The microphone wire 44R connected to the microphone 42 is directed to the region J by being drawn towards the microphone wire 44 so as to pass over the lens assembly 1 in order to avoid the sensor module 2 that is a noise source, and is connected to the microphone wire connector 317.

As shown in FIG. 19, the audio IC 303 and its peripheral circuitry are arranged in the region J at the upper side of the main substrate 30. The microphone wire connector 317 and the audio IC 303 are arranged in the region J at the lower side and the upper side, respectively.

Since the microphone wire connector 317 is arranged at one side in the region J and the audio IC 303 is arranged at the other side in the region J, the microphone wire connector 317 and the audio IC 303 can be arranged close to each other in the region J that does not have sufficient area.

After the analog audio signals collected with the microphones 42 and 43 are transmitted to the microphone wire connector 317, the signals are inputted into the audio IC 303 that is closely arranged at the lower side. The microphone wire connector 317 is equivalent to an example of a sound signal transferring unit of the present invention, and the audio IC 303 is equivalent to an example of a sound signal processing unit of the present invention.

The audio IC 303 and its peripheral circuitry convert the analog audio signal into a digital audio signal (an A/D conversion). Since the digital audio signal is hardly affected by to another signal and is immune to noise, it is transferred via the signal pattern drawn inside the main substrate 30 after the A/D conversion and is inputted to the main IC 301.

Since the microphone wire connector 317 is arranged in the region J of the main substrate 30 that is extended towards the microphone 43, the connecting distances between the microphone 43 and the main substrate 30 through the microphone wire 44L can be shortened.

Moreover, since the audio IC 303 and the microphone wire connector 317 are arranged at the upper and lower sides in the region J of the main substrate 30, respectively, it becomes possible to perform the A/D conversion of the analog audio signal by the audio IC 303 promptly. Accordingly, the audio signal is not affected by another signal, and it becomes possible to prevent the deterioration of the audio signal.

As mentioned above, the FPC 202 of the sensor substrate 20 and the heat dissipation sheet 24 adjoin mutually at the upper side of the rigid section 201 of the sensor substrate 20, and are extended upward. The right and left sides of the sensor substrate 20 are inserted between the region K and the region J of the main substrate 30. The tripod base 33 is arranged at the lower side of the main substrate 30 at the rear side of the sensor substrate 20.

Accordingly, the optimal arrangements of the FPC 202 of the sensor substrate 20 and the heat dissipation sheet 24 are that they are extended upward from the rigid section 201 of the sensor substrate 20 within the range of the horizontal width E (FIG. 15) of the lens unit 1A.

Figure 21:
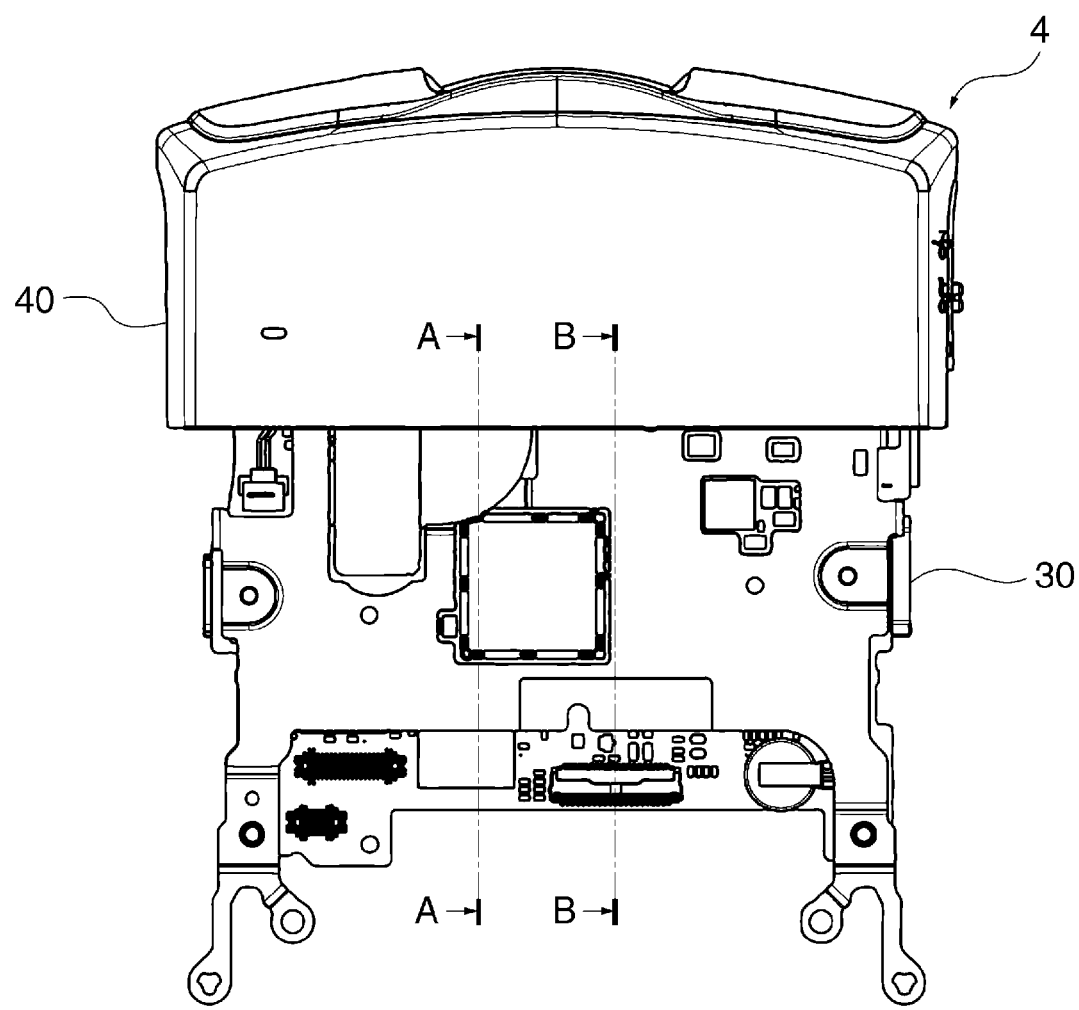
FIG. 21 is a schematic view showing a state where a main substrate has been incorporated to a front cover of the digital camera shown in FIG. 1 viewed from the top side of the camera body.
Figure 22:
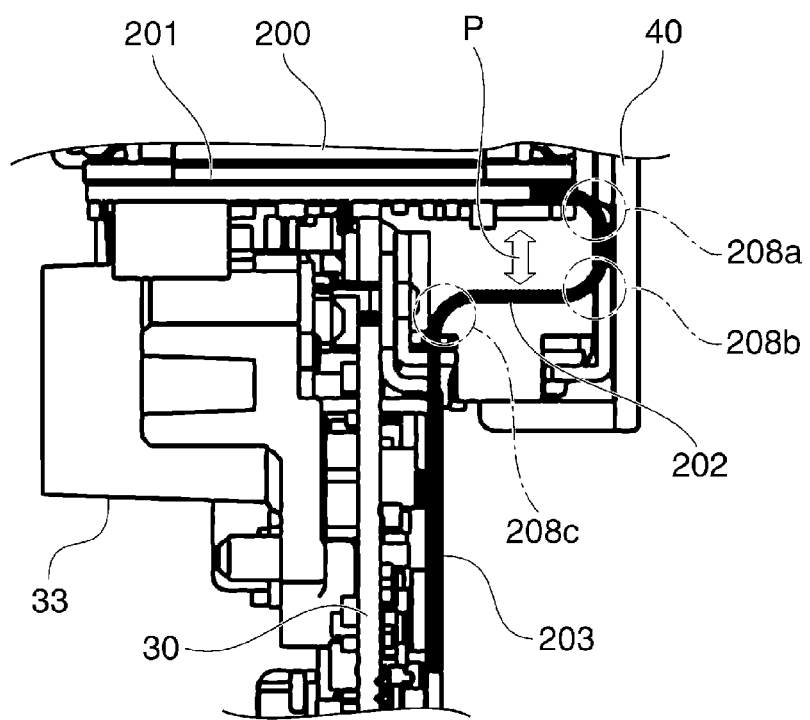
FIG. 22 is a sectional view taken along A-A line in FIG. 21.

FIG. 21 is a view showing a state where the main substrate 30 has been incorporated into the front cover 40 viewed from the top side of the camera body 4. FIG. 22 is a sectional view taken along A-A line in FIG. 21.

As mentioned above, the relative distance between the lens assembly 1 and the sensor module 2 in the optical axis direction varies with the tilt adjustment of the image pickup device 200 with respect to the lens unit 1A. Accordingly, the distance between the sensor substrate 20 and the main substrate 30 varies due to the individual specificity of the camera body 4. For this reason, the FPC 202 of the sensor substrate 20 is required to absorb the variation in the distance between the terminal sections of the sensor substrate 20 and the main substrate 30.

Moreover, it is necessary not to deviate the appropriate position of the image pickup surface of the image pickup device 200 that has been adjusted with the tilt adjustment due to the reaction force to the rigid section 201 by the FPC 202 in the state where the FPC 202 is connected to the main substrate 30.

As shown in FIG. 22, the FPC 202 is connected to the main substrate 30 while bending at two or more bending sections (three sections in this embodiment) 208a through 208c in the direction to the implementing surface of the main substrate 30 that is arranged so as to be approximately perpendicular to the implementing surface for the image pickup device 200 of the sensor substrate 20. It should be noted that the thickness of the FPC 202 is about 100 μm in this embodiment.

The FPC 202 is extended upward (rightward in FIG. 22) from the sensor substrate 20, and is bent in the optical axis direction (downward in FIG. 22) at the bending section 208a at which the FPC 202 hits the front cover 40. Moreover, since the FPC 202 is pulled by the connecting section to the main substrate 30, it is bent in the direction towards the bottom of the camera body 4 (leftward in FIG. 22) at the bending section 208b.

The FPC 202 is bent in the optical axis direction (downward in FIG. 22) at the bending section 208c, and the sensor connector 207 implemented on the connector rigid portion 203 is connected to the sensor connector 304 implemented on the main substrate 30. It should be noted that the sensor connectors 207 and 304 are BtoB (Board to Board) connectors, and are connected to the implementing surface of the main substrate 30 in an approximately perpendicular direction.

In this way, the FPC 202 is extended upwards from the rigid section 201 of the sensor substrate 20, is bent at the three bending sections 208a through 208c, and is connected to the main substrate 30. This enables good connection irrespective of the connection length, because the flexure amounts at the bending sections 208a through 208c of the FPC 202 merely vary even if the distance between the sensor substrate 20 and the main substrate 30 varies with the focus adjustment or the tilt adjustment of the image pickup device 200.

Moreover, since the FPC 202 is bent at the three bending sections 208a through 208c, the reaction force can be dispersed so as not to directly apply the reaction force in the arrow P direction in FIG. 22 to the rigid section 201, and the position deviation of the image pickup surface of the image pickup device 200 can be prevented.

Furthermore, the FPC 202 is bent most sharply at the first bending section 208a. On the other hand, since the portion from which the FPC 202 is drawn out is narrower than the other portion by the size i to form the step, a specified length to the bending section 208a of the FPC 202 is reserved. This enables to reserve the flexure margin in the bending section 208a, and it becomes possible to further reduce the reaction force applied to the rigid section 201.

Figure 23:
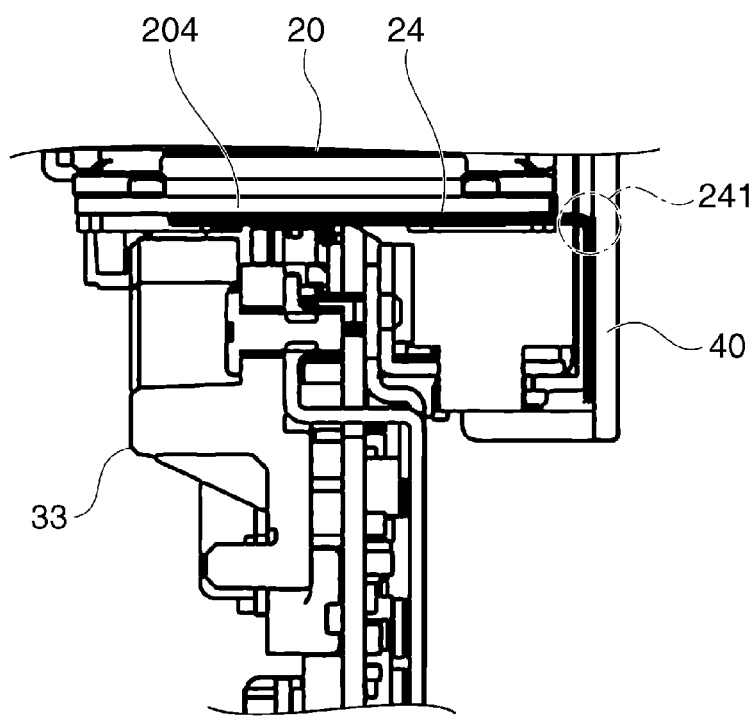
FIG. 23 is a sectional view taken along B-B line in FIG. 21.

FIG. 23 is a sectional view taken along B-B line in FIG. 21. As shown in FIG. 23, one end of the heat dissipation sheet 24 is pasted on the copper foil exposed area 204 that is the back of the rigid section 201 of the sensor substrate 20 with double-stick tape, and is thermally connected. Moreover, the other end of the heat dissipation sheet 24 is bent at a bending section 241 in the optical axis direction (downward in FIG. 23), and is pasted on the back of the front cover 40 to be thermally connected.

Figure 24:
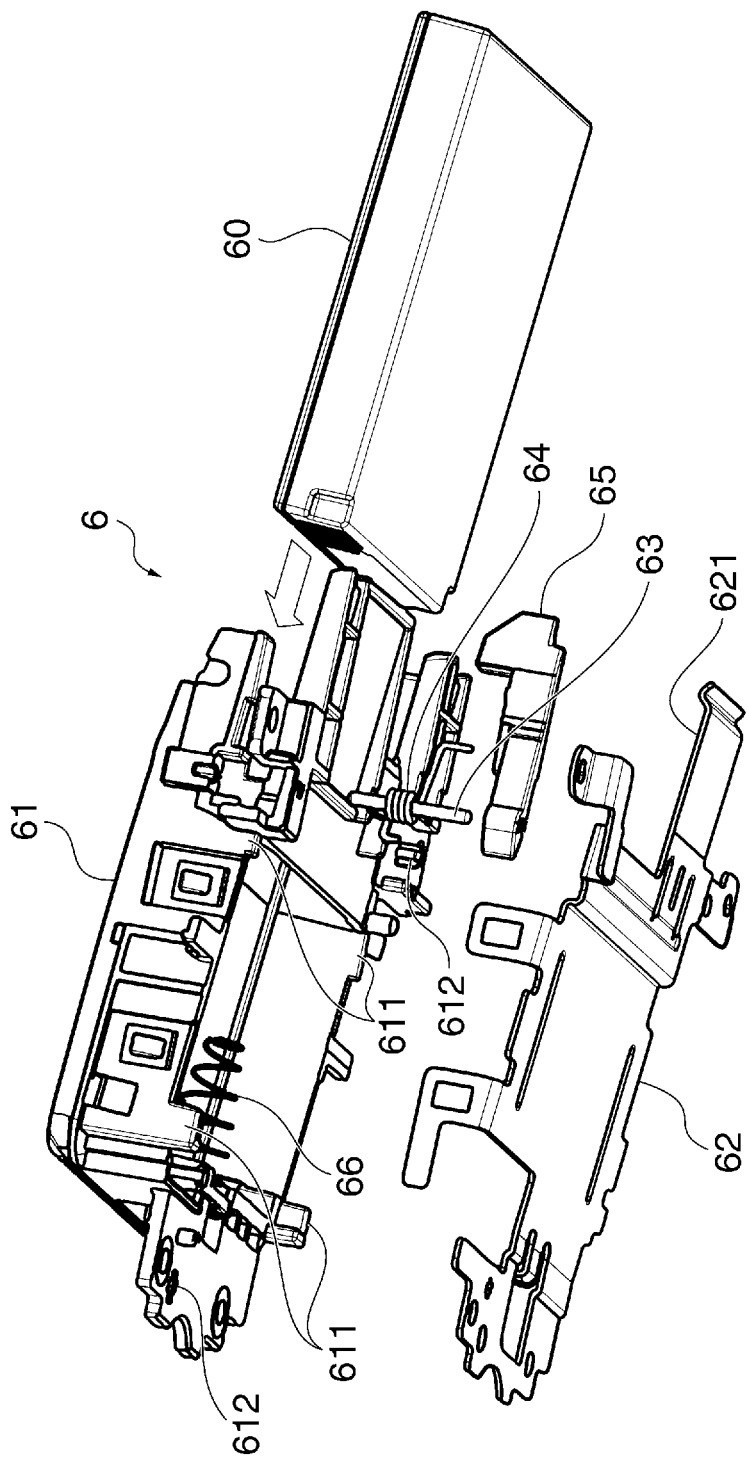
FIG. 24 is an exploded perspective view showing a power unit of the digital camera shown in FIG. 1.
Figure 25:
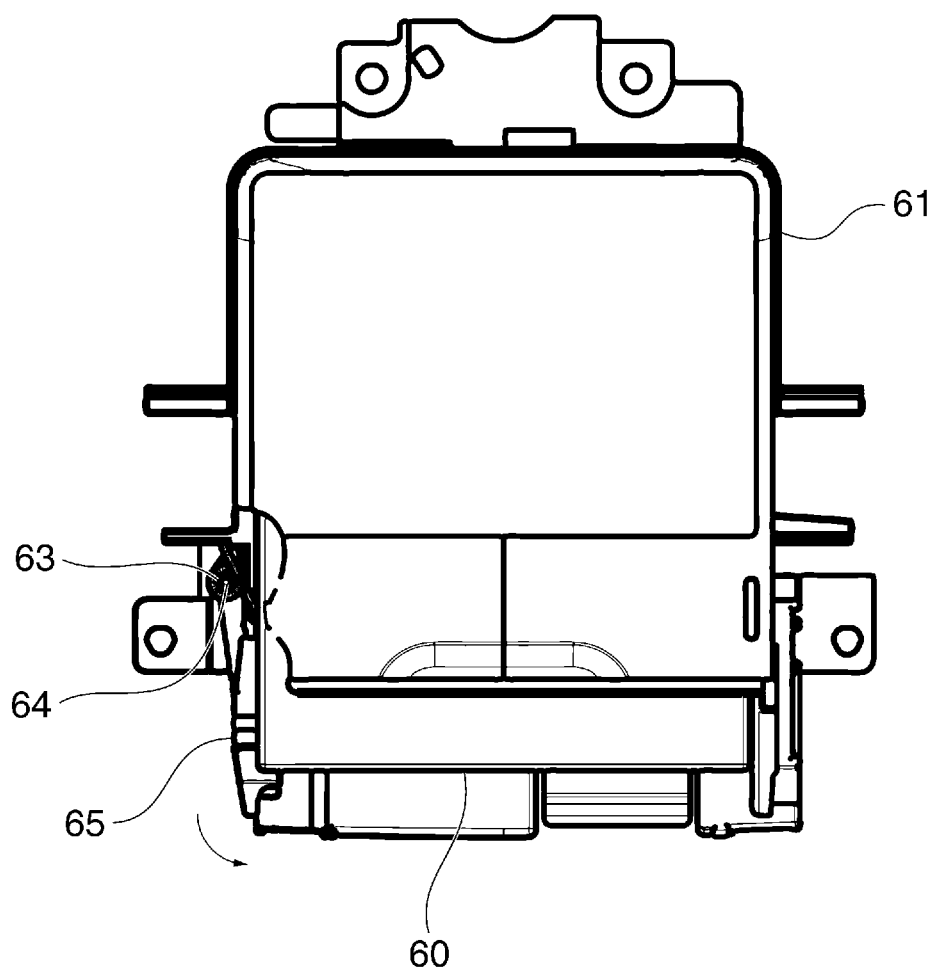
FIG. 25 is a partially broken view showing the assembly of the power unit shown in FIG. 24 viewed from the bottom side of the camera body.
Figure 26:
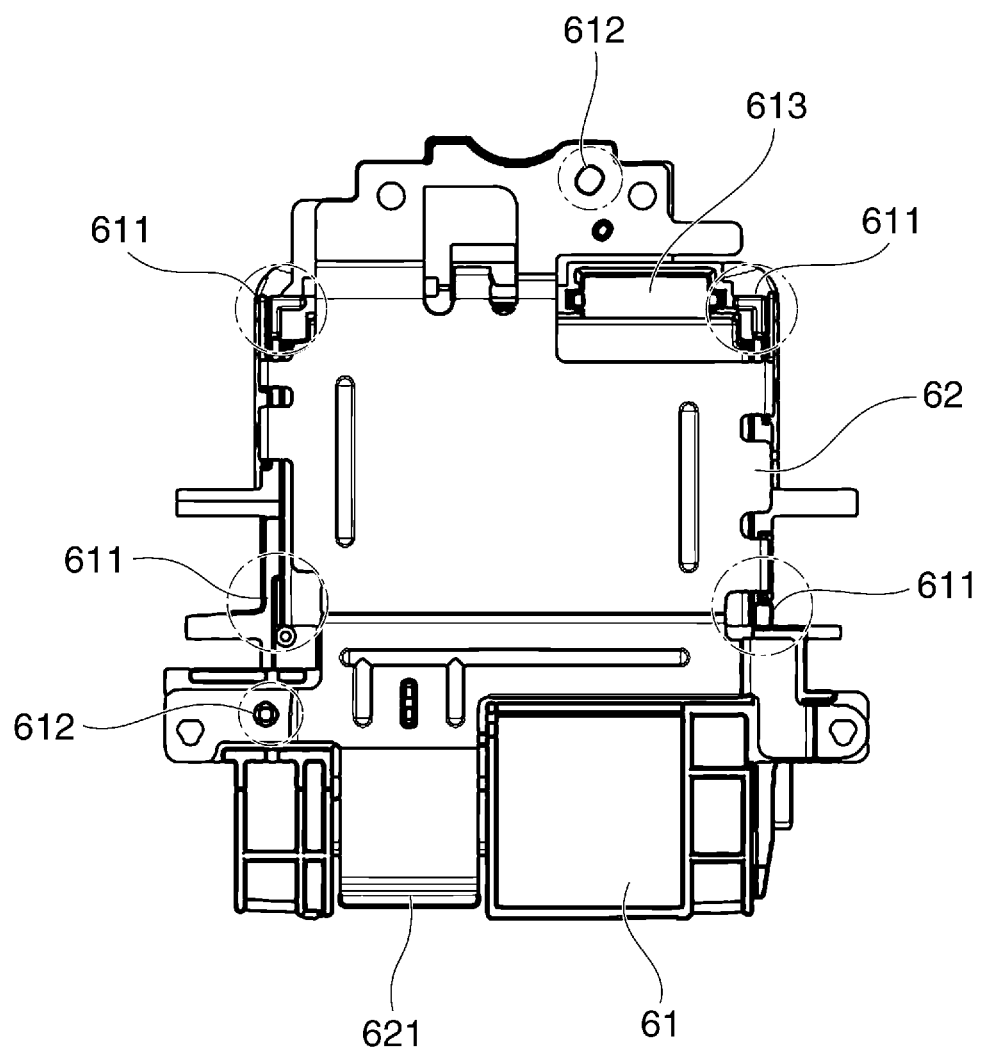
FIG. 26 is a view showing the assembly of the power unit shown in FIG. 24 viewed from the top side of the camera body.

FIG. 24 is an exploded perspective view showing the power unit 6. FIG. 25 is a partially broken view showing the assembly of the power unit 6 shown in FIG. 24 viewed from the bottom side of the camera body 4. FIG. 26 is a view showing the assembly of the power unit 6 shown in FIG. 24 viewed from the top side of the camera body 4.

As shown in FIG. 24 through FIG. 26, the battery 60 is detachably stored in the battery box 61. The battery box 61 is provided with four box bracket ribs 611 that are projected. Moreover, the battery box 61 is provided with a pair of box positioning sections 612, which consists of a round boss and an oblong hole, and a battery terminal fitting section 613 (see FIG. 26).

A bottom opening of the battery box 61 is covered with a battery holding metal plate 62. The battery holding metal plate 62A has a battery lid lock 621 that is projected to the rear side of the camera body 4. It should be noted that the battery box 61 is made from resin in this embodiment. The battery holding metal plate 62 is enough thinner than the thickness of the battery box 61.

A battery lock shaft 63 is inserted in the battery box 61, and a battery lock spring 64 is sheathed to the battery lock shaft 63. A battery locking lever 65 locks the battery 60 stored in the battery box 61. A battery ejection spring 66 pushes the battery 60 stored in the battery box 61 to an ejecting direction.

The battery 60 is formed in an approximately flat rectangular shape, is inserted into the battery box 61 from the rear side of the camera body 4, and is stored. The battery holding metal plate 62 is arranged at the side opposite to the main substrate 30 in the state where the power unit 6 is attached to the camera body 4.

The battery 60 stored in the battery box 61 is pushed to the ejecting direction by the battery ejection spring 66. The battery 60 is held in the battery box 61 because the battery locking lever 65 supports the corner of the battery 60 in this state as shown in FIG. 25.

The battery locking lever 65 and the battery lock spring 64 are supported by the battery lock shaft 63. In this state, the battery lock shaft 63 is inserted through a hole formed in the battery box 61, and is incorporated in the battery box 61.

At this time, the battery locking lever 65 is pushed by the battery lock spring 64 in a direction (an arrow direction in FIG. 25) for locking the battery 60. Accordingly, the battery 60 is locked by the battery locking lever 65, and is held inside the battery box 61.

When ejecting the battery 60 from the battery box 61, a user rotates the battery locking lever 65 in the direction reverse to the arrow direction in FIG. 25 against the pushing force of the battery lock spring 64. This releases the lock of the battery 60 by the battery locking lever 65, and the battery 60 is ejected out of the battery box 61 by the pushing force of the battery ejection spring 66.

Figure 27:
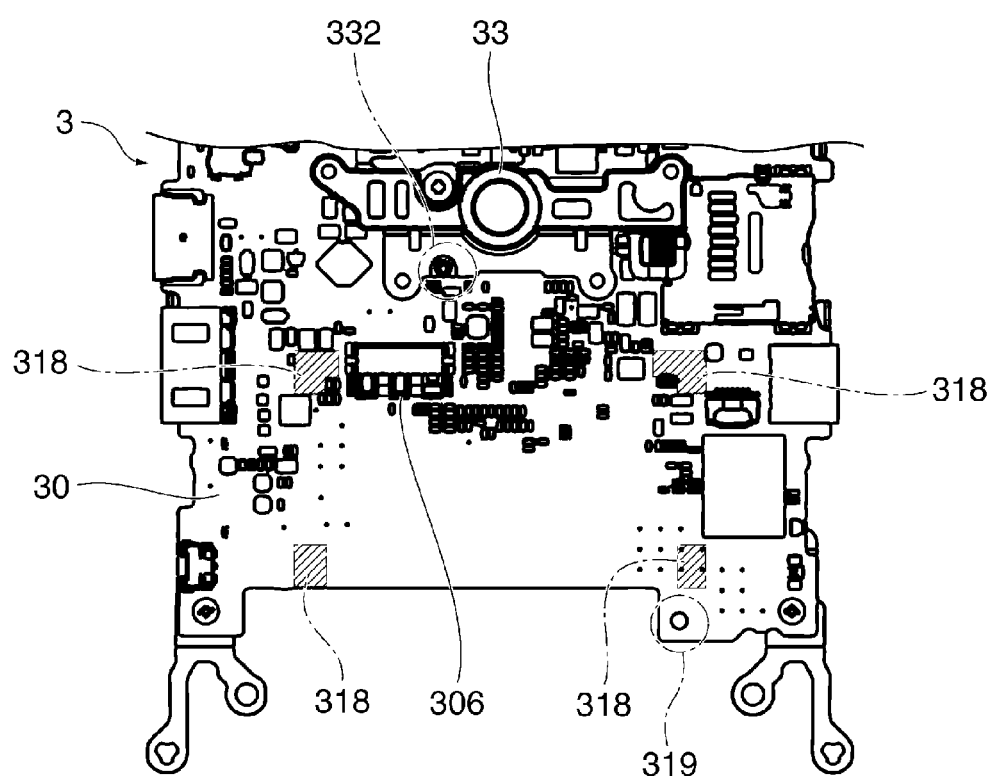
FIG. 27 is a view showing the main board unit of the digital camera shown in FIG. 1 to which a tripod base is attached viewed from the bottom side of the camera body.
Figure 28:
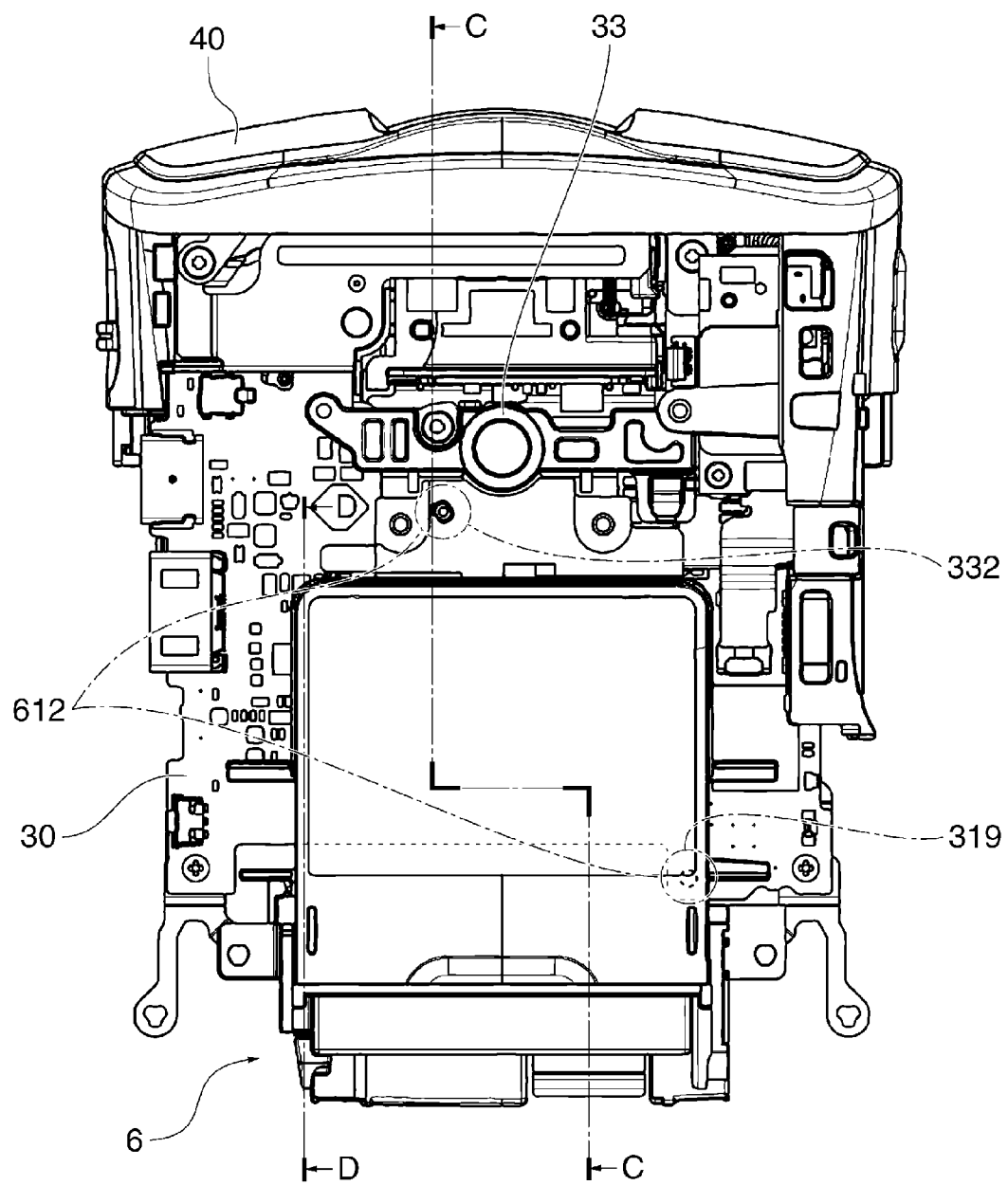
FIG. 28 is a view showing a state where the front cover and the power unit have been incorporated to the main board unit of the digital camera shown in FIG. 1 to which the tripod base is attached viewed from the bottom side of the camera body.

FIG. 27 is a view showing the main board unit 3 to which a tripod base 33 is attached viewed from the bottom side of the camera body 4. FIG. 28 is a view showing a state where the front cover 40 and the power unit 6 have been incorporated to the main board unit 3 to which the tripod base 33 is attached viewed from the bottom side of the camera body 4.

As shown in FIG. 27, four box bracket sections 318 are provided on the lower side of the main substrate 30 in total. Two box bracket sections 318 are provided in the front side, and the other two box bracket sections 318 are provided in the rear side. These box bracket sections 318 are arranged in spaces in which neither the implemented components nor the signal patterns exist at the lower side of the main substrate 30.

Where the power unit 6 is incorporated into the main board unit 3, the four box bracket ribs 611 of the battery box 61 contact the four box bracket sections 318 of the main substrate 30, respectively.

The two front box bracket sections 318 among the four box bracket sections 318 of the main substrate 30 are arranged near the center of the main substrate 30 at positions corresponding to the right and left dampers 36 mounted at the upper side of the main substrate 30 shown in FIG. 17. When the box bracket ribs 611 contact the box bracket sections 318 in this state, a specified gap is formed between the power unit 6 and the main substrate 30.

A box positioning boss 332 is formed to be projected on the tripod base 33, and a box positioning hole 319 is formed in the main substrate 30 as a through hole. The battery box 61 is positioned to the camera body 4 because the box positioning sections 612 formed on the battery box 61 fit in the box positioning boss 332 of the tripod base 33 and in the box positioning hole 319 of the main substrate 30.

The battery box 61 is positioned by the tripod base 33 and the main substrate 30. However, since the battery terminal 306 has a floating structure mentioned later, it becomes possible to absorb a position deviation of the battery box 61 to the battery terminal fitting section 613. Moreover, as shown in FIG. 28, the power unit 6 is arranged so as to be overlapped with the main substrate 30 by a specified quantity.

The digital camera of this embodiment is formed so that the bottom of the camera body 4 inclines in the direction that the rear side approaches the optical axis of the lens assembly 1 (hip-up). Since the bottom of the camera body 4 inclines in such a way, an area of the ground in a taken image can be reduced when an image is taken by the camera put on the ground, and the camera is seemed smaller than the actual size.

Figure 29A:
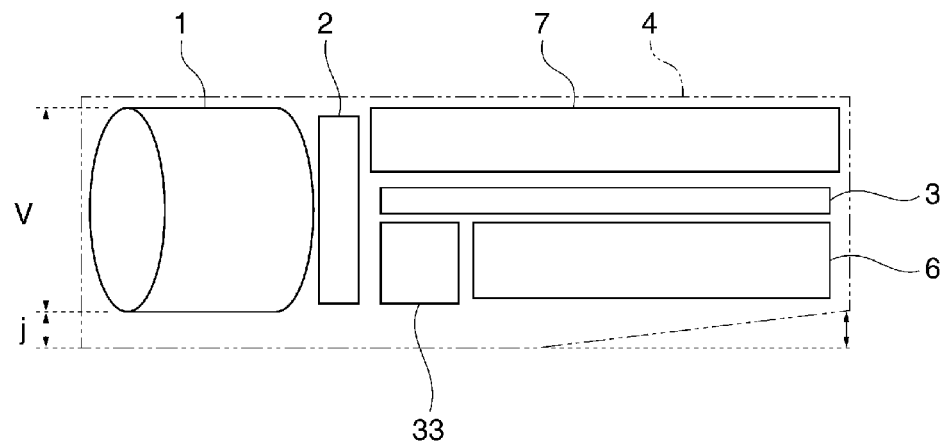
FIG. 29A is a view schematically showing arrangements of parts in a comparative example in which a power unit is arranged in parallel to a main board unit and a rear side of a camera body is formed in a hip-up shape.
Figure 29B:
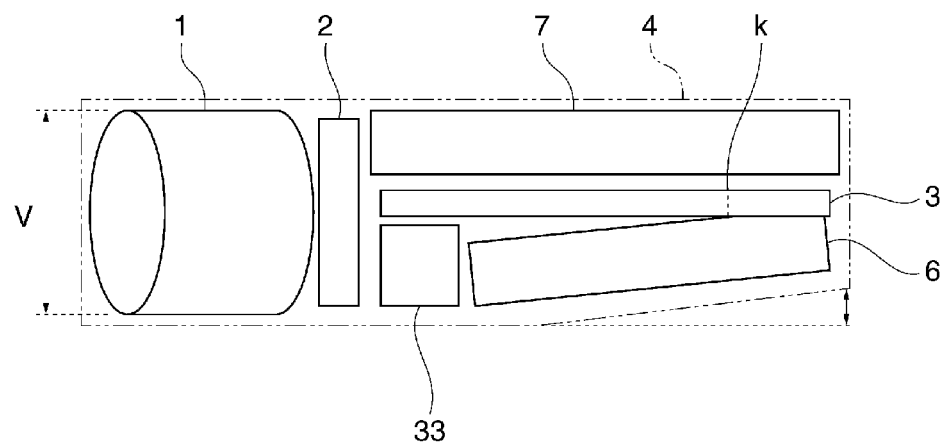
FIG. 29B is a view schematically showing arrangements of parts of the digital camera shown in FIG. 1 in which the power unit is slantingly arranged so that the rear side of the power unit closes to the main board unit and the rear side of the camera body is formed in a hip-up shape.

FIG. 29A is a view schematically showing arrangements of parts in a comparative example in which the power unit 6 is arranged in parallel to the main board unit 3 and a rear side of the camera body 4 is formed in a hip-up shape. FIG. 29B is a view schematically showing arrangements of parts in the embodiment in which the power unit 6 is slantingly arranged so that the rear side of the power unit 6 closes to the main board unit 3 and the rear side of the camera body 4 is formed in a hip-up shape.

In the comparative example shown in FIG. 29A, the height of the camera body 4 is larger than the vertical size V of the lens assembly 1 by a size j. On the other hand, in this embodiment shown in FIG. 29B, the height of the camera body 4 is approximately equal to the vertical size V of the lens assembly 1, and the display unit 7, the main board unit 3, and the power unit 6 are settled within the vertical size V.

Accordingly, this embodiment enables to form the bottom of the camera body 4 in a hip-up shape while miniaturizing and thinning the camera.

Figure 30:
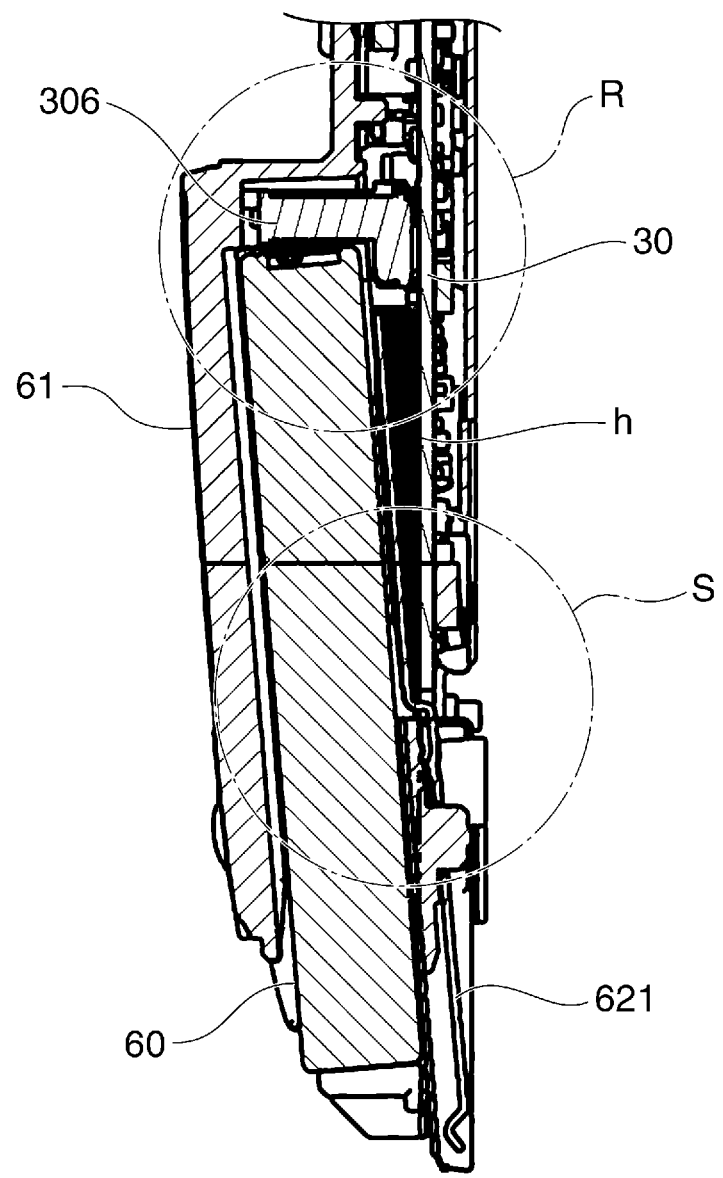
FIG. 30 is a sectional view taken along C-C line in FIG. 28.
Figure 31A:
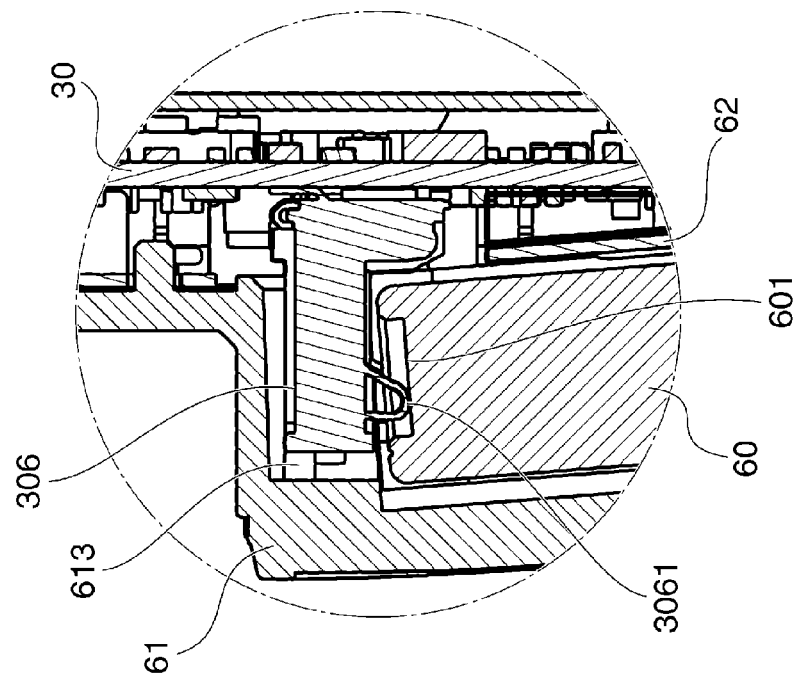
FIG. 31A is an enlarged detailed view showing an R-section in FIG. 30.
Figure 31B:
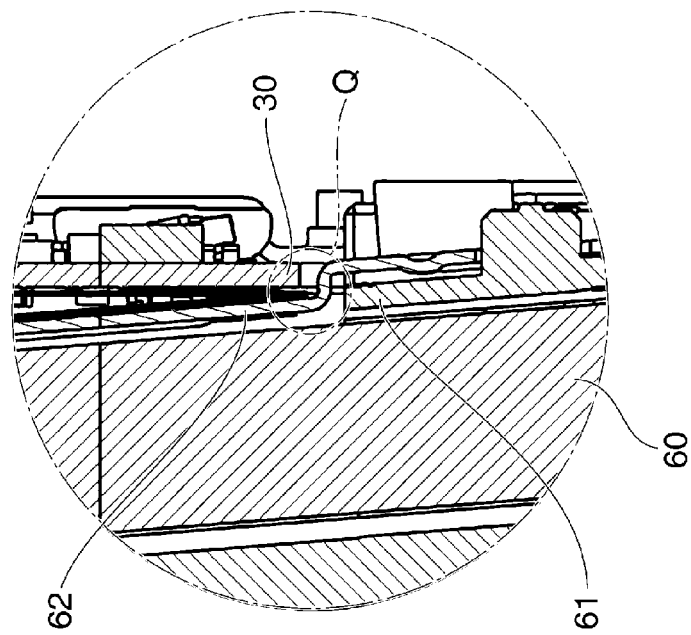
FIG. 31B is an enlarged detailed view showing an S-section in FIG. 30.

FIG. 30 is a sectional view taken along C-C line in FIG. 28. FIG. 31A is an enlarged detailed view showing an R-section in FIG. 30. FIG. 31B is an enlarged detailed view showing an S-section in FIG. 30.

As shown in FIG. 30, the battery terminal 306 is implemented to the main substrate 30 perpendicularly. The power unit 6 is arranged so as to incline with respect to the implementing surface of the main substrate 30 by a predetermined angle (5 degrees in this embodiment).

Accordingly, the battery 60 is stored into the battery box 61 in a state where the battery 60 inclines with respect to the battery terminal 306 by a predetermined angle. This battery 60 inclines so as to approach the main substrate 30 as it becomes near to the rear side of the camera body 4. As shown in FIG. 30, an approximately triangular region h is formed by the battery holding metal plate 62 that inclines to the main substrate 30 and the implementing surface of the main substrate 30.

As mentioned above, since the battery terminal 306 is implemented on the lower side of the main substrate 30 and the battery 60 overlaps with the main substrate 30 in the specified quantity, the battery terminal 306 is arranged inside the contour of the main substrate 30. Moreover, three terminal contacts 3061 shown in FIG. 31A are provided in the battery terminal 306. Each of the terminal contacts 3061 has an R-shaped portion at the tip end.

On the other hand, a battery terminal section 601 is provided in the battery 60. In the mounting state where the battery 60 is mounted to the battery box 61, the battery 60 supplies power to the main board unit 3 because the battery terminal section 601 contacts the terminal contacts 3061.

Since the R-shaped portion is formed at the tip end of the terminal contact 3061, the terminal contact 3061 can satisfactorily contact the battery-terminal section 601 of the battery 60 that has been inserted to be inclined.

Moreover, the battery terminal 306 is movable (a floating structure) within a specified amount towards the implementing surface in a state where the battery terminal 306 has been implemented on the main substrate 30. When the battery box 61 is incorporated, the battery terminal fitting section 613 of the battery box 61 fits the battery terminal 306, and the battery terminal 306 is positioned with respect to the battery box 61.

Since the power unit 6 is arranged to be inclined so that the rear end approaches the main substrate 30, the above-mentioned notch Q (see FIG. 17) is formed on the main substrate 30 in order to avoid interference between the power unit 6 and the main substrate 30. The notch Q restricts the implementing area of the side of the lower end in FIG. 17 (the rear side) of the main substrate 30.

As mentioned above, since the region L on the left side of the notch Q and the region M on the right side of the notch Q are suitable for arranging external interface components with small circuit structures, the access LED 314 is arranged in the region L and the reproduction switch 313 is arranged in the region M in this embodiment. Accordingly, the implementing area of the main substrate 30 can be used effectively.

As mentioned above, in this embodiment, the battery holding metal plate 62 of the power unit 6 is formed thinly enough with respect to the battery box 61 and is arranged on the side of the main substrate 30. The battery 60 is arranged so that the rear end of the battery 60 approaches the main substrate 30. Moreover, the battery box 61 made from resin has a specified thickness, and forms the bottom exterior of the camera body 4 that has relatively high strength.

Moreover, when the battery 60 is not inserted, the battery box 61 is a cavity, and is extremely disadvantageous to an external shock. For this reason, the external surface of the battery box 61 needs to be formed at high strength.

As shown in FIG. 31B, the battery holding metal plate 62 close to the main substrate 30 is bent to the side of the main substrate 30 in the end section of the notch Q of the main substrate 30.

In the rear side (lower side in FIG. 31B) of the camera body 4, one side (right side in FIG. 31B) of the battery 60 is supported by the battery holding metal plate 62 in the front part (upper part in FIG. 31B) than the bending section, and is supported by the battery box 61 in the rear part (lower part in FIG. 31B) than the bending section. That is, a box shape that encloses the storage space of the battery 60 on every side is formed by the battery box 61 in the rear part of the camera body 4 than the notch Q of the main substrate 30.

This increases the strength of the battery box 61, and sufficient strength to external shock, external shock applied in a state where the battery 60 is not inserted in particular, can be obtained.

Figure 32:
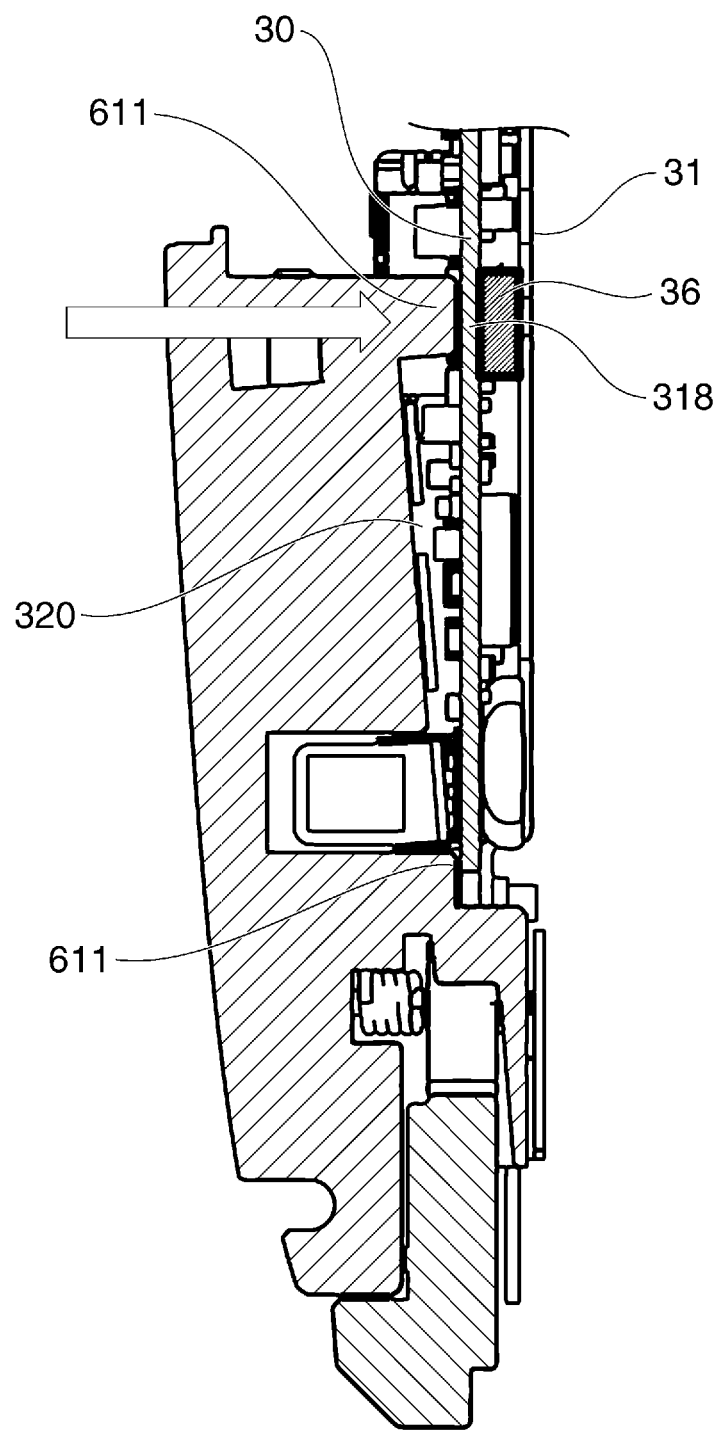
FIG. 32 is a cross sectional view taken along D-D line in FIG. 28.

FIG. 32 is a cross sectional view taken along D-D line in FIG. 28. In the area h of the triangular shape mentioned above, components 320 that are implemented to the main substrate 30 are arranged. Since the area h is surrounded by the battery holding metal plate 62 and the main substrate 30, there is concern about a short circuit with the battery holding metal plate 62, and there is a limitation of the space in the height direction (horizontal direction in FIG. 32) of the camera body 4.

Accordingly, the components 320 are implemented on the main substrate 30 in the area h so that the height of each of the parts gradually decreases towards the rear side (downward in FIG. 32) of the camera body 4 in this embodiment. This enables to arrange the components 320 on the main substrate 30 appropriately even in the triangular area h, and enables to use the space on the main substrate 30 effectively.

Moreover, FIG. 32 shows a positional relationship between the box bracket rib 611 of the battery box 61 and the box bracket section 318 of the main substrate 30, and a positional relationship between the damper 36 and the main holder 31.

When an impact force in a direction shown by an arrow in FIG. 32 is applied to the battery box 61 and big load acts on the box bracket section 318 due to fall etc., the main substrate 30 may be greatly bent at the box bracket section 318 and may be damaged.

Accordingly, the damper 36 is arranged at the upper side (right side in FIG. 32) of the main substrate 30 corresponding to the box bracket section 318, and the damper 36 is held between the main substrate 30 and the main holder 31 in this embodiment.

Accordingly, when an impact force in the arrow direction is applied to the box bracket section 318, the impact force can be attenuated and the bending of the main substrate 30 in the arrow direction can be prevented. Therefore, the main substrate 30 can be protected from an impact force due to fall etc.

Moreover, since the bending of the main substrate 30 is prevented, the components are satisfactorily arranged on the main substrate 30, without generating a short circuit between the components implemented on the main substrate 30 and battery holding metal plate 62, even if the power unit 6 overlaps with the main substrate 30.

As described above, this embodiment is able to provide the heat dissipation structure of the image pickup device 200 that is capable of dissipating heat generated by the image pickup device 200 efficiently, even when the small image pickup device 200 like an LGA that has electrode pads on almost all the back face is used.

Moreover, the main board unit 3 is arranged so as to surround the rear side and right and left sides of the lens unit 1A in the direction approximately parallel to the optical axis of the lens assembly 1 within the range of the height V of the lens unit 1A in the vertical direction in this embodiment. This configuration can provide a digital camera that can be thinner than the sum of the height of the lens unit 1A and the thickness of the main board unit 3 in the vertical direction.

It should be noted that the present invention is not limited to what has been described in the above-mentioned embodiment, quality of the material, a shape, a size, a formation, the number of elements, arrangement locations, etc., can be changed suitably unless it is deviated from the scope of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-148520 and No. 2013-148521, filed Jul. 17, 2013, which are hereby incorporated by reference herein in their entireties.

What is claimed is:

1. An image pickup apparatus comprising:
a lens unit configured to have a lens assembly that is arranged at a front side of an apparatus body, and an image pickup device that photoelectrically converts subject light that is incident on the lens assembly;
a circuit board unit provided in the apparatus body and configured to be arranged so as to surround a rear side and right and left sides of the lens unit in a direction approximately parallel to an optical axis of the lens assembly within the range of the height of the lens unit in a vertical direction; and
a microphone,
wherein at least one of a right region or a left region of the circuit board unit surrounding the right or left side of the lens unit is extended toward the front side of the apparatus body to form an extended region, and
wherein the extended region includes a sound signal processing unit configured to process a sound signal collected by the microphone.

2. The image pickup apparatus according to claim 1, wherein the extended region includes an operation switch configured to be operatable in a direction that is approximately perpendicular to the optical axis of the lens assembly and is approximately perpendicular to a height direction of the lens unit.

3. The image pickup apparatus according to claim 1, wherein the microphone is arranged at the front side of the apparatus body in front of the extended region of the circuit board unit.

4. The image pickup apparatus according to claim 1, wherein the extended region includes a sound signal transferring unit configured to transfer the sound signal collected with the microphone to the sound signal processing unit.

5. An image pickup apparatus comprising:
a lens unit configured to have a lens assembly that is arranged at a front side of an apparatus body, and an image pickup device that photoelectrically converts subject light that is incident on the lens assembly; and
a circuit board on which a plurality of electric parts are arranged, the circuit board provided in the apparatus body and configured to be arranged so as to surround a rear side and right and left sides of the lens unit in a direction approximately parallel to an optical axis of the lens assembly within the range of the height of the lens unit in a vertical direction,
wherein at least one of a right region or a left region of the circuit board surrounding the right or left side of the lens unit is extended toward the front side of the apparatus body to form an extended region, the extended region having at least one of the plurality of electric parts.

6. The image pickup apparatus according to claim 5, wherein the extended region includes an operation switch configured to be operatable in a direction that is approximately perpendicular to the optical axis of the lens assembly and is approximately perpendicular to a height direction of the lens unit.

7. The image pickup apparatus according to claim 5, further comprising a microphone configured to collect a sound signal and to be arranged at the front side of the apparatus body in front of the extended region of the circuit board.

8. The image pickup apparatus according to claim 7, wherein the extended region includes a sound signal transferring unit configured to transfer the sound signal collected with the microphone to a sound signal processing unit configured to process the sound signal collected by the microphone.

* * * * *